(12) United States Patent
Yoshii et al.

(10) Patent No.: US 12,397,867 B2
(45) Date of Patent: Aug. 26, 2025

(54) WORK MACHINE

(71) Applicant: Kubota Corporation, Osaka (JP)

(72) Inventors: Kaichiro Yoshii, Sakai (JP); Minoru Hiraoka, Sakai (JP); Yukifumi Yamanaka, Sakai (JP); Junichi Ishikawa, Sakai (JP); Yusuke Ida, Sakai (JP); Yuhei Hazawa, Sakai (JP); Katsutoshi Jinnouchi, Sakai (JP); Ryota Niki, Sakai (JP); Ryota Yamagishi, Sakai (JP); Yuma Ikeda, Sakai (JP); Taichi Okumura, Sakai (JP); Tomohiro Shimazaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/961,584

(22) Filed: Nov. 27, 2024

(65) Prior Publication Data

US 2025/0206395 A1 Jun. 26, 2025

(30) Foreign Application Priority Data

| Dec. 22, 2023 | (JP) | 2023-217420 |
| Dec. 22, 2023 | (JP) | 2023-217421 |
| Dec. 22, 2023 | (JP) | 2023-217422 |

(51) Int. Cl.
*B62D 65/12* (2006.01)
*B60K 17/04* (2006.01)

(52) U.S. Cl.
CPC .............. *B62D 65/12* (2013.01); *B60K 17/04* (2013.01)

(58) Field of Classification Search
CPC ................................. B62D 65/12; B60K 17/04
See application file for complete search history.

(56) References Cited

U.S. PATENT DOCUMENTS

| 2,065,437 | A | * | 12/1936 | Ewens | F16H 9/04 |
| | | | | | 474/4 |
| 2,729,299 | A | * | 1/1956 | Rink | B60K 28/14 |
| | | | | | 180/274 |
| 2,871,585 | A | * | 2/1959 | Merry | A01D 69/002 |
| | | | | | 37/243 |
| 4,971,170 | A | * | 11/1990 | Rasmussen | B60K 6/00 |
| | | | | | 903/902 |
| 9,493,185 | B2 | * | 11/2016 | Dada | B60G 15/067 |
| 11,383,776 | B2 | * | 7/2022 | Ning | B62D 63/02 |
| 11,472,308 | B2 | * | 10/2022 | Messina | H01M 50/20 |
| 11,535,099 | B2 | * | 12/2022 | Shimazaki | B60K 5/04 |
| 12,275,295 | B2 | * | 4/2025 | Takeda | B60K 17/04 |
| 2023/0000003 | A1 | * | 1/2023 | Chrysanthakopoulos | |
| | | | | | A01M 21/046 |

FOREIGN PATENT DOCUMENTS

| JP | 2014125107 A | 7/2014 | |
| WO | WO-2019085979 A1 * | 5/2019 | ............... B61F 5/30 |

* cited by examiner

*Primary Examiner* — Faye M Fleming
(74) *Attorney, Agent, or Firm* — Keating & Bennett, LLP

(57) ABSTRACT

A work machine includes a front wheel, a rear wheel, an intermediate wheel between the front wheel and the rear wheel, and a transmission to receive a driving force from a drive source and transmit the driving force to the intermediate wheel and at least one of the front wheel or the rear wheel that is drivable as a driving wheel. The intermediate wheel has an outside diameter smaller than an outside diameter of the driving wheel.

18 Claims, 21 Drawing Sheets

WORK MACHINE

CROSS REFERENCE TO RELATED APPLICATIONS

This application claims the benefit of priority to Japanese Patent Applications JP2023-217420, JP2023-217421 and JP2023-217422 respectively filed on Dec. 22, 2023. The entire contents of each application are hereby incorporated herein by reference.

BACKGROUND OF THE INVENTION

1. Field of the Invention

The present invention relates to work machines and agricultural machines.

2. Description of the Related Art

JP2014-125107A describes a tractor (a work machine and an agricultural machine) including a vehicle body frame (a body frame), an engine hood provided for a front portion of the vehicle body frame, front wheels supported by the front portion of the vehicle body frame so as to be rotatable, and rear wheels supported by a rear portion of the vehicle body frame so as to be rotatable.

In a case where a vehicle body of such a work machine sinks or skids due to a working ground being a damp ground, an uneven ground, or the like, a work depth changes, or its work results in poor finish.

Example embodiments of the present invention provide work machines each of which can perform work while the work machine is traveling in a state where a vehicle body is less likely to sink or skid and which can be achieved at a low cost. In addition, example embodiments of the present invention provide work machines each of which can travel and perform work in a state where a vehicle body is less likely to sink and which can be easily subjected to maintenance.

In the meantime, in a case where the front wheel of such an agricultural machine falls into a recess of a traveling path and a travel resistance is applied to the front wheel, the travel resistance to the front wheel becomes strong due to a load of a motor section being applied to the front wheel, so that the rear wheels easily skid. The damp ground particularly easily causes a skid. When a skid occurs, the work results in poor finish.

Example embodiments of the present invention provide agricultural machines each of which can travel in a state where the agricultural machine is less likely to skid, which can easily turn, and which can be easily achieved at a low cost.

SUMMARY OF THE INVENTION

A work machine according to an example embodiment of the present invention includes a front wheel, a rear wheel, an intermediate wheel between the front wheel and the rear wheel, and a transmission to receive a driving force from a drive source and transmit the driving force to the intermediate wheel and at least one of the front wheel or the rear wheel that is drivable as a driving wheel. The intermediate wheel has an outside diameter smaller than an outside diameter of the driving wheel.

In this configuration, the intermediate wheel and at least one of the front wheel or the rear wheel are driven to cause the vehicle body to travel with the front wheel, the rear wheel, and the intermediate wheel being grounded and supporting the vehicle body. As a result, the vehicle body is less likely to sink or skid. In comparison with a support structure of a crawler belt in a case where a crawler is used, a support structure for the front wheel, the rear wheel, and the intermediate wheel is simplified. In addition, the driving force from the transmission is commonly used for the drive of the at least one of the front wheel or the rear wheel and the drive of the intermediate wheel, so that a drive structure is simplified. Besides, the outside diameter of the intermediate wheel is smaller than the outside diameter of the at least one of the front wheel or the rear wheel, so that the cost of the intermediate wheel is reduced. That is, with this configuration, it is possible to achieve a work machine that can travel and work with the vehicle body being less likely to sink or skid, with an inexpensive configuration.

In an example embodiment of the present invention, a work machine may further include a vehicle body frame including the transmission to transmit the driving force to the at least one of the front wheel or the rear wheel, and a retention frame holding the intermediate wheel such that the intermediate wheel is rotatable and capable of transmitting the driving force from the transmission to the intermediate wheel.

In this configuration, the driving force from the transmission is transmitted to the intermediate wheel via the retention frame supporting the intermediate wheel. Thus, a power transmission to transmit power to the intermediate wheel is also used as the retention frame, thus making it possible to reduce the number of components and to achieve an inexpensive configuration.

In an example embodiment of the present invention, the retention frame may include an intermediate wheel holder holding the intermediate wheel such that the intermediate wheel is rotatable, a wheel holder holding at least one wheel out of the front wheel and the rear wheel such that the at least one wheel is rotatable, and a pivot shaft provided for an intermediate portion of the retention frame which intermediate portion is between the intermediate wheel holder and the wheel holder, the pivot shaft being coupled to the vehicle body frame.

In this configuration, when the pivot shaft is coupled to the vehicle body frame, the retention frame can be coupled to the vehicle body frame, and the intermediate wheel can be attached to the vehicle body frame. Since the pivot shaft is between the wheel holder and the intermediate wheel holder, the pivot shaft is easily coupled to the vehicle body frame, so that the intermediate wheel is easily supported by the vehicle body frame.

In an example embodiment of the present invention, a work machine may further include a wheel power transmission provided for the retention frame to transmit the driving force from the transmission to the at least one wheel held by the wheel holder, and an intermediate-wheel power transmission provided for the retention frame to transmit the driving force from the transmission to the intermediate wheel.

In this configuration, the retention frame is utilized to support the wheel power transmission and the intermediate-wheel power transmission. This makes it possible to reduce the number of components and to achieve an inexpensive configuration.

In an example embodiment of the present invention, a work machine may further include an input section provided for the pivot shaft to receive the driving force from the transmission. The driving force from the input section may be transmitted to the wheel power transmission, and the driving force from the input section may be transmitted to the intermediate-wheel power transmission.

In this configuration, the input section receives the driving force from the transmission and transmits the driving force to the wheel power transmission and the intermediate-wheel power transmission. Accordingly, in comparison with a case where the driving force from the transmission is transmitted individually to the wheel power transmission and the intermediate-wheel power transmission, it is possible to reduce the number of required input sections and to achieve an inexpensive configuration.

In an example embodiment of the present invention, the retention frame may include the wheel holder to hold the at least one wheel out of the front wheel or the rear wheel such that the at least one wheel is rotatable.

In this configuration, the retention frame supports the intermediate wheel and at least one wheel out of the front wheel and the rear wheel. Accordingly, the at least one wheel and the intermediate wheel are both attached to the vehicle body frame via the retention frame. Thus, it is not necessary to separately provide a wheel retention frame via which the at least one wheel is supported by the vehicle body frame and an intermediate-wheel retention frame via which the intermediate wheel is supported by the vehicle body frame. As a result, it is possible to reduce troubles caused by an operation to support the at least one wheel and the intermediate wheel by the vehicle body frame, thus making it possible to achieve an inexpensive configuration.

In an example embodiment of the present invention, a work machine may further include a power transmission to receive the driving force from the transmission and transmit the driving force thus received to the input section. The power transmission may be capable of being braked.

In this configuration, when the power transmission is braked, a braking force applied to the power transmission is transmitted to the input section. The braking force applied to the power transmission is transmitted from the input section to the wheel via the wheel power transmission so that the wheel is braked, and the braking force applied to the power transmission is also transmitted from the input section to the intermediate wheel via the intermediate-wheel power transmission so that the intermediate wheel is braked. For example, an operator or the like can brake the wheel and the intermediate wheel just by a simple operation to brake the power transmission.

In an example embodiment of the present invention, the wheel power transmission and the intermediate-wheel power transmission may each include an endless roller chain.

In this configuration, the wheel power transmission and the intermediate-wheel power transmission each perform power transmission with use of the endless roller chain. Accordingly, in comparison with a configuration in which the wheel power transmission and the intermediate-wheel power transmission each perform power transmission with use of an interlocking rod, the wheel power transmission and the intermediate-wheel power transmission become lightweight and compact.

In an example embodiment of the present invention, the wheel power transmission and the intermediate-wheel power transmission may each include a gear transmission section.

In this configuration, the transmission ratio or the transmission rotation direction of a transmission gear in the gear transmission section is adjusted. As a result, power output from the input section is changed in rotation speed or rotation direction via the gear transmission section and transmitted to the intermediate wheel or the wheel. Accordingly, the driving speed or the rotation direction of the intermediate wheel or the wheel is easily adjusted by the gear transmission section.

In an example embodiment of the present invention, the gear transmission section may change a rotation direction of power from the input section so as to cause the at least one wheel and the intermediate wheel held by the intermediate wheel holder to rotate in a direction reverse to a rotation direction of the input section, and output the power.

In this configuration, the wheel and the intermediate wheel can be driven in a rotation direction reverse to the rotation direction of the power output from the input section.

In an example embodiment of the present invention, the retention frame may be supported by the vehicle body frame so as to be swingable around a pivot shaft axis of the pivot shaft as a swing axis which pivot shaft axis extends along a width of a body of the work machine.

In this configuration, the retention frame swings around the pivot shaft axis as a swing pivot. As a result, the state of the intermediate wheel is switched between a grounded state where the intermediate wheel swings relative to the vehicle frame to be lowered and grounded and an ungrounded state where the intermediate wheel swings relative to the vehicle frame to be lifted from the ground. When the intermediate wheel is switched to the grounded state, the front wheel, the rear wheel, and the intermediate wheel are grounded and support the vehicle body. As a result, the work machine easily travels straight and can travel while the work machine is less likely to sink or skid. When the intermediate wheel is switched to the ungrounded state, only the front wheel and the rear wheel are grounded and support the vehicle body. As a result, in comparison with a case where the front wheel, the rear wheel, and the intermediate wheel are grounded, the work machine has a small turning resistance, so that the work machine easily turns.

In an example embodiment of the present invention, the wheel holder may hold the rear wheel.

In this configuration, the rear wheel swings relative to the vehicle body frame to be lifted and lowered in response to vertical swinging of the retention frame relative to the vehicle body frame. When the rear wheel swings to be lowered, the rear wheel pushes up the vehicle body frame with the ground as a reaction force point. Accordingly, the vehicle body is changed to a posture where the rear side of the vehicle body is lifted (a rear lifting posture).

In an example embodiment of the present invention, the retention frame may include a wheel-side portion and an intermediate-wheel-side portion, the wheel-side portion extending from the intermediate portion toward the wheel holder, the intermediate-wheel-side portion extending from the intermediate portion toward the intermediate wheel holder, and in a side view of a body of the work machine, the wheel-side portion is higher in position than the intermediate-wheel-side portion, and the wheel-side portion is inclined away from the intermediate portion.

In this configuration, in a state where the intermediate wheel and the at least one wheel are grounded, a retention frame having a shape with a small useless portion is achieved as a retention frame supporting the intermediate wheel and the at least one wheel having an axle center higher in position than the axle center of the intermediate wheel. This makes it possible to achieve an inexpensive configuration.

A work machine according to an example embodiment of the present invention includes a boarding operation section provided for a rear portion of a body of the work machine, a front wheel, a rear wheel, an intermediate wheel between the front wheel and the rear wheel, and a retention frame provided laterally outward of a body frame of the work machine and holding the intermediate wheel and the rear wheel. The retention frame extends in a front-rear direction below the operation section in a side view of the vehicle body.

In this configuration, when the vehicle body is supported with the front wheel, the rear wheel, and the intermediate wheel being grounded, the vehicle body is less likely to sink in comparison with a case where only the front wheel and the rear wheel are grounded. In comparison with a support structure of a crawler belt in a case where a crawler is used, a support structure for the rear wheel and the intermediate wheel is simplified. The retention frame is provided laterally outward of the vehicle body frame and extends in the front-rear direction below the operation section in the front-rear direction in a side view of the vehicle body. Accordingly, in addition to the support structure or the like for the rear wheel and the intermediate wheel being simplified, an operator or the like easily performs inspection or maintenance on the support structure or the like from laterally outward of the vehicle body or below the vehicle body, for example. That is, with this configuration, the work machine can travel and work with the vehicle body being less likely to sink, and besides, a maintenance operation is easily performed.

In an example embodiment of the present invention, the retention frame may have a center in the front-rear direction which center is rearward of a center of the vehicle body frame in the front-rear direction.

In this configuration, the rear wheel is disposed in a rearward portion of the vehicle body. In a case where the rear wheel is disposed in the rearward portion of the vehicle body, at the time when a work device is towed, for example, the rear portion of the vehicle body which rear portion receives a load is firmly supported by the rear wheel, so that the work machine easily travels while towing the work device.

In an example embodiment of the present invention, a work machine may further include a pivot shaft including a pivot shaft axis extending along a width of the body. The retention frame may be coupled to the vehicle body frame via the pivot shaft and held by the vehicle body frame so as to be swingable around the pivot shaft axis as a swing axis, and the intermediate wheel and the rear wheel may be attached to the vehicle body frame via the retention frame so as to be vertically swingable.

In this configuration, the intermediate wheel and the rear wheel are lifted and lowered relative to the vehicle body frame around the pivot shaft axis as a swing axis in response to swinging of the retention frame. The swinging of the retention frame can switch the intermediate wheel and the rear wheel between a state where the intermediate wheel and the rear wheel are both grounded and a state where the intermediate wheel is ungrounded but the rear wheel is grounded.

In an example embodiment of the present invention, a work machine may further include an actuator to operate the retention frame. The actuator may be capable of changing the retention frame between a first posture in which the intermediate wheel and the rear wheel are grounded and a second posture in which the intermediate wheel is ungrounded.

In this configuration, when the retention frame is switched to the first posture, the intermediate wheel and the rear wheel are grounded. In this state, the vehicle body is supported with the front wheel, the rear wheel, and the intermediate wheel being grounded, the work machine can easily travel straight. When the retention frame is switched to the second posture, the rear wheel is grounded, but the intermediate wheel is ungrounded. In this state, the vehicle body is supported with only the front wheel and the rear wheel being grounded, so that the vehicle body has a small turning resistance in comparison with a state where the front wheel, the intermediate wheel, and the rear wheel are grounded. As a result, the work machine easily turns. A work machine can travel while the work machine selects a state where the work machine easily travels straight or a state where the work machine easily turns.

In an example embodiment of the present invention, a work machine may further include a coupler to couple a work device with the vehicle body so as to allow the vehicle body to tow the work device.

In this configuration, the work machine can tow a work device by coupling the work machine to the work device by the coupler. The work machine can travel while the work machine tows the work device so as to cause the work device to work.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described below with reference to the drawings. Note that, in the following description, in terms of a vehicle body of a tractor (an example of a "work machine" and an "agricultural machine"), a direction of an arrow F illustrated in FIGS. 1, 2 and so on is referred to as a "vehicle-body front side," a direction of an arrow B is referred to as a "vehicle-body rear side," a direction of an arrow U is referred to as a "vehicle-body upper side," a direction of an arrow D is referred to as a "vehicle-body lower side," a direction of an arrow L is referred to as a "vehicle-body left side," and a direction of an arrow R is referred to as a "vehicle-body right side." A vehicle body right-left direction corresponds to a vehicle-body width direction.

Figure 1:
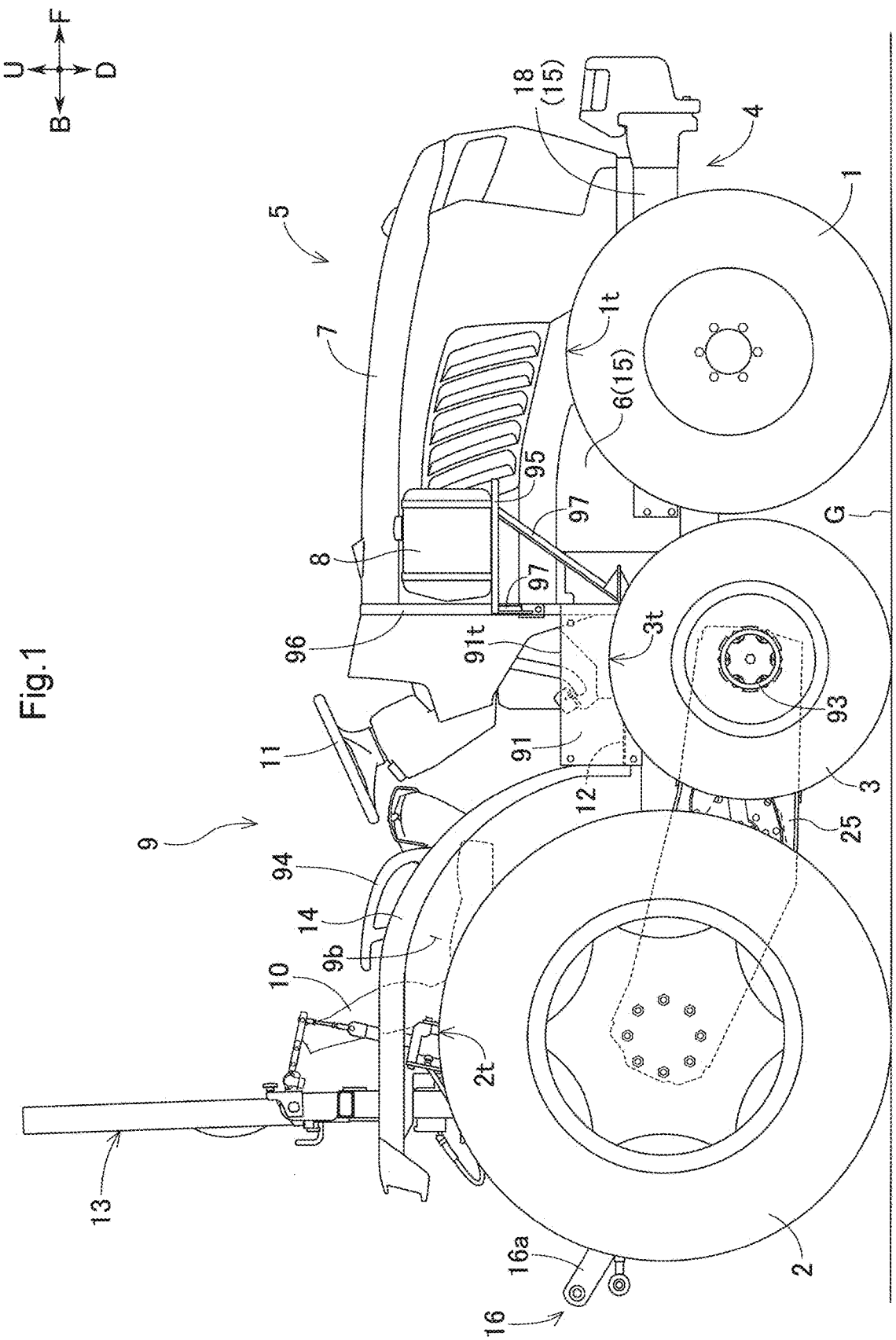
FIG. 1 is a side view of a tractor viewed from a right side.
Figure 2:
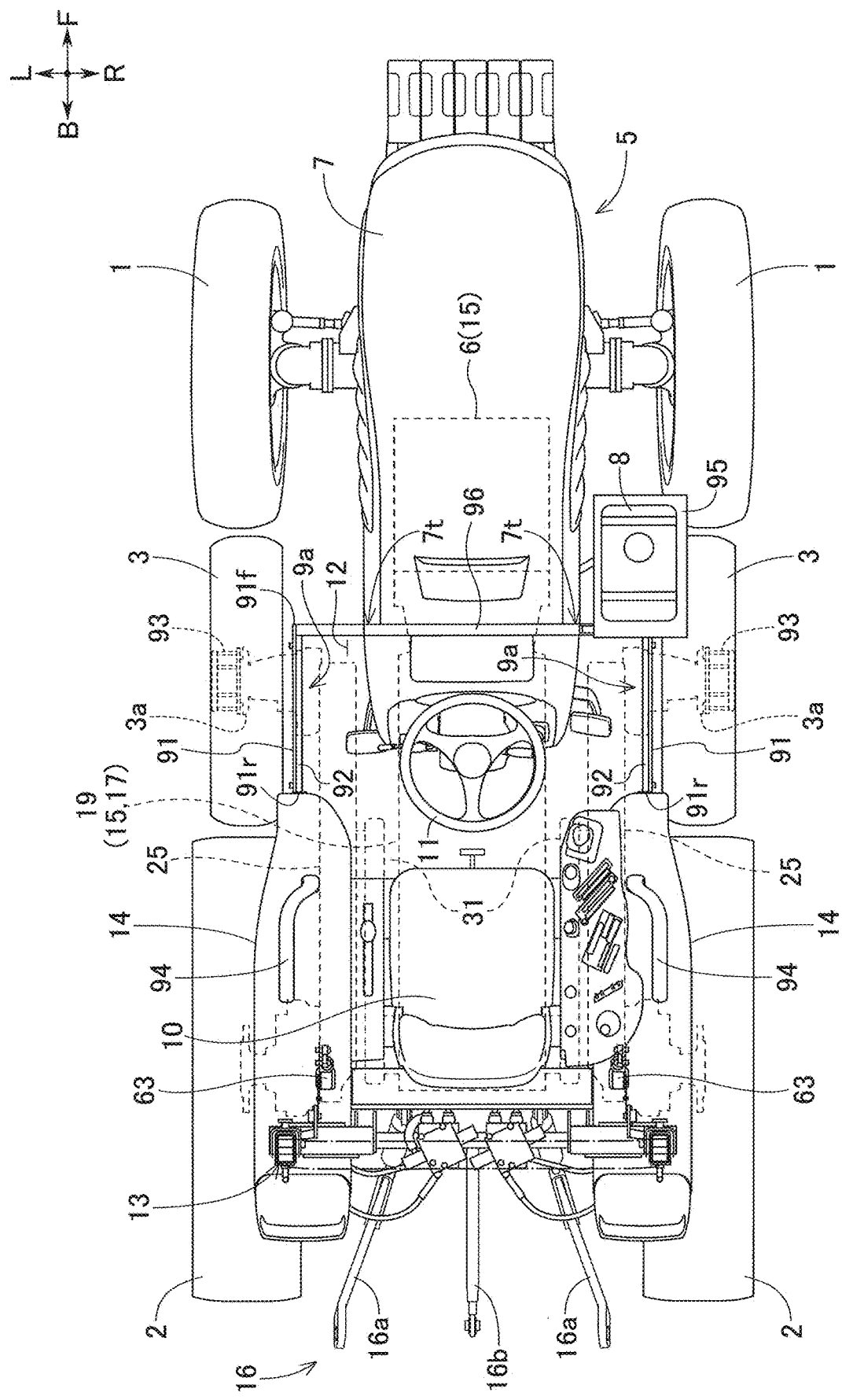
FIG. 2 is a plan view of the tractor.

As illustrated in FIGS. 1, 2, the tractor includes a pair of right and left front wheels 1, a pair of right and left rear wheels 2, a pair of right and left intermediate wheels 3, and a vehicle body 4. The front wheels 1 are configured to be steerable and drivable. The rear wheels 2 and the intermediate wheels 3 are both configured to be drivable. The vehicle body 4 is supported by the pair of right and left front wheels 1, the pair of right and left rear wheels 2, and the pair of right and left intermediate wheels 3. The front wheels 1, the rear wheels 2, and the intermediate wheels 3 are tire wheels. The vehicle body 4 has a front portion including a motor section 5. The motor section 5 is provided with an engine 6, an engine bonnet 7 covering the engine 6, and so on. A fuel tank 8 for the engine is provided on the right side of the engine bonnet 7. The vehicle body 4 has a rear portion including a riding-type operation section 9 on which a driver rides to operate the vehicle body. The operation section 9 does not include a so-called cabin and is open on all sides. As illustrated in FIGS. 1, 2, the operation section 9 includes an operation seat 10, a steering wheel 11 configured to steer the front wheels 1, a step 12 as a floor provided forward of and below the operation seat 10, a ROPS 13, and so on. Rear-wheel fenders 14 are provided laterally outward of both sides of the operation section 9 so as to cover respective rear wheels 2. The ROPS 13 is provided rearward of the operation seat 10 so as to extend upward from a vehicle body frame 15. A coupler 16 is provided rearward of the vehicle body frame 15. The coupler 16 is tractably coupled to various work devices such as a rotary cultivating device (not illustrated).

Figure 5:
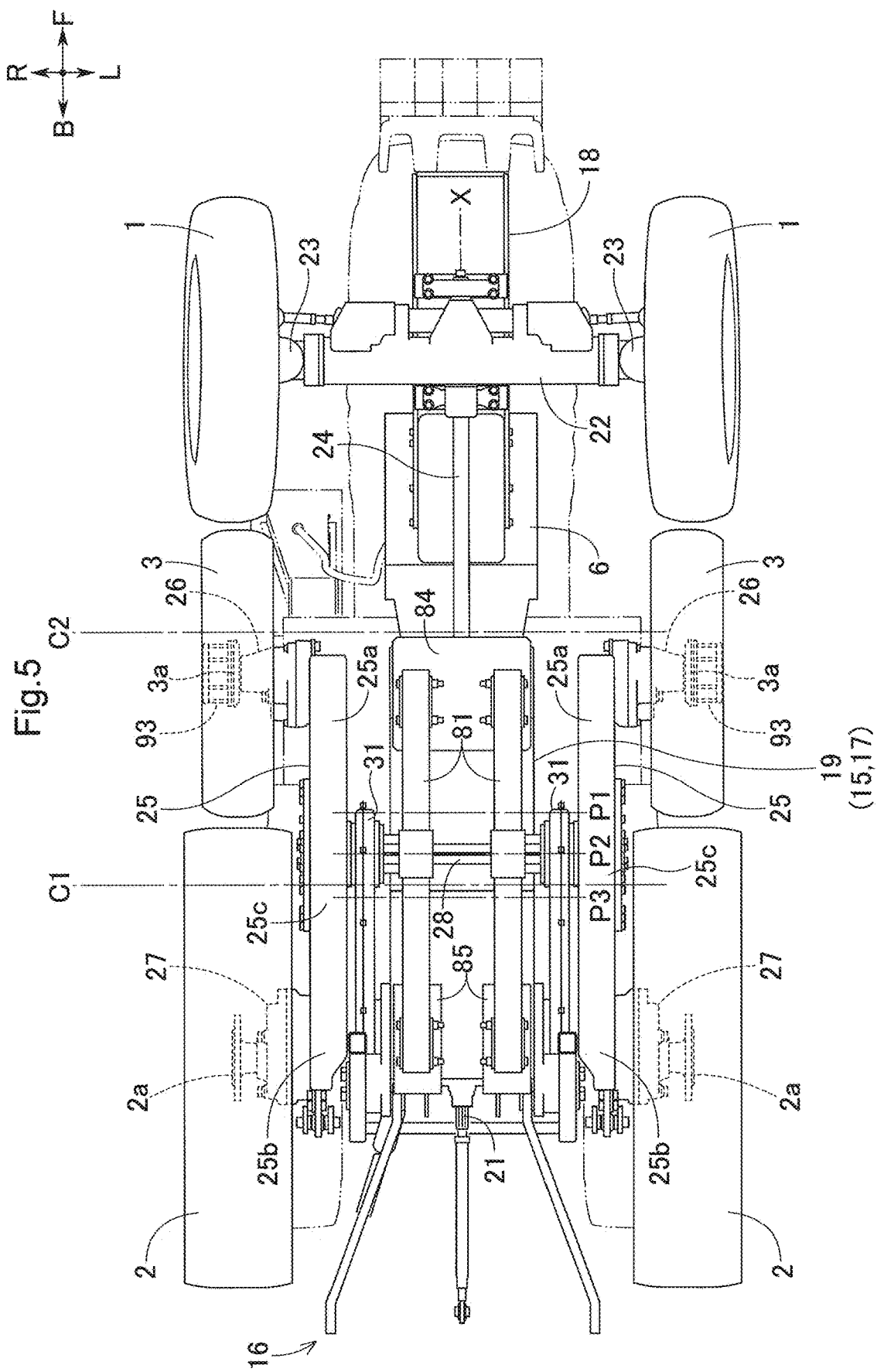
FIG. 5 is a bottom plan view illustrating a support structure for front wheels, the intermediate wheels, and rear wheels.
Figure 6:
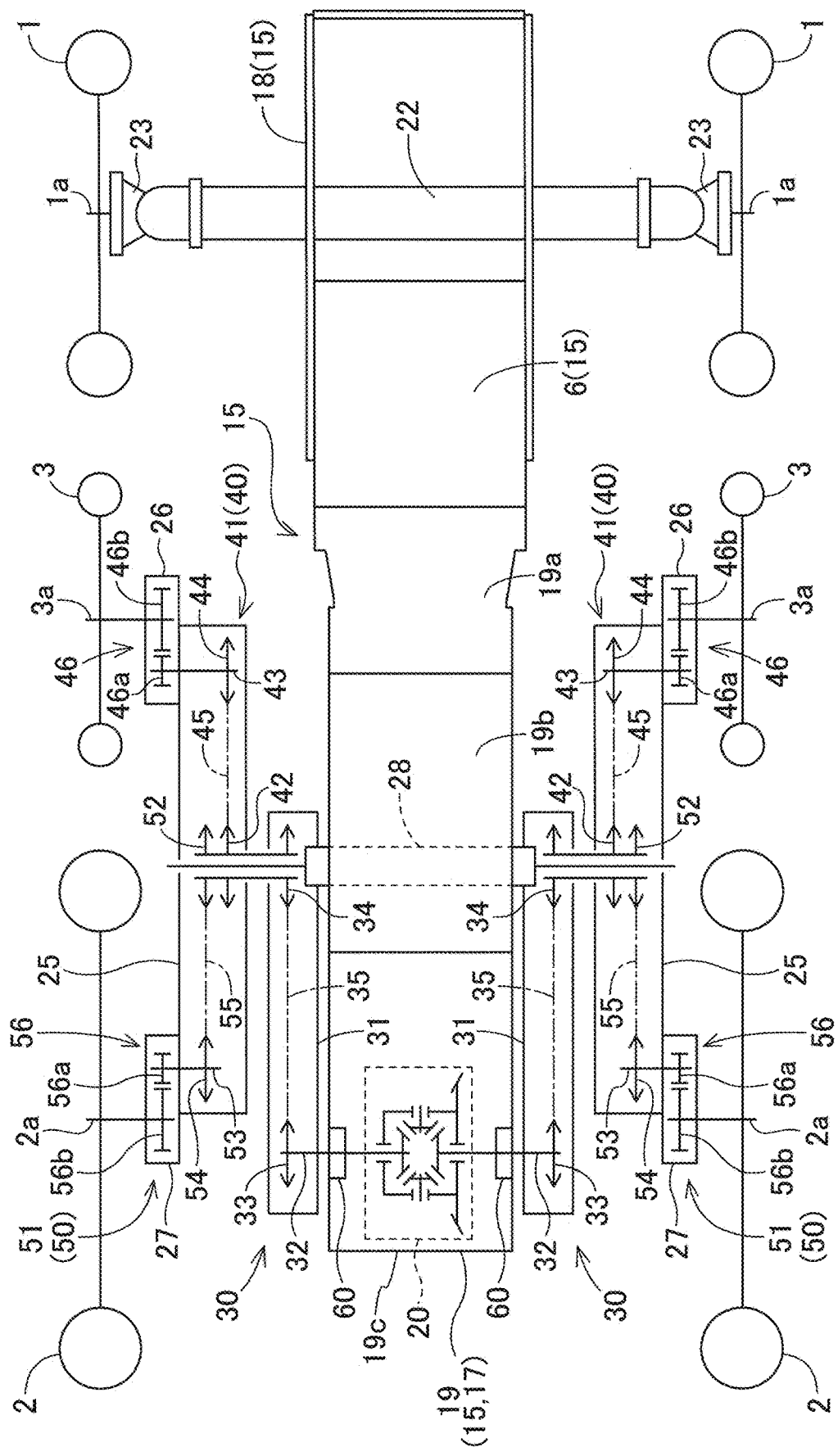
FIG. 6 is an explanatory drawing illustrating an upstream transmission, a wheel power transmission, and an intermediate-wheel power transmission.
Figure 7:
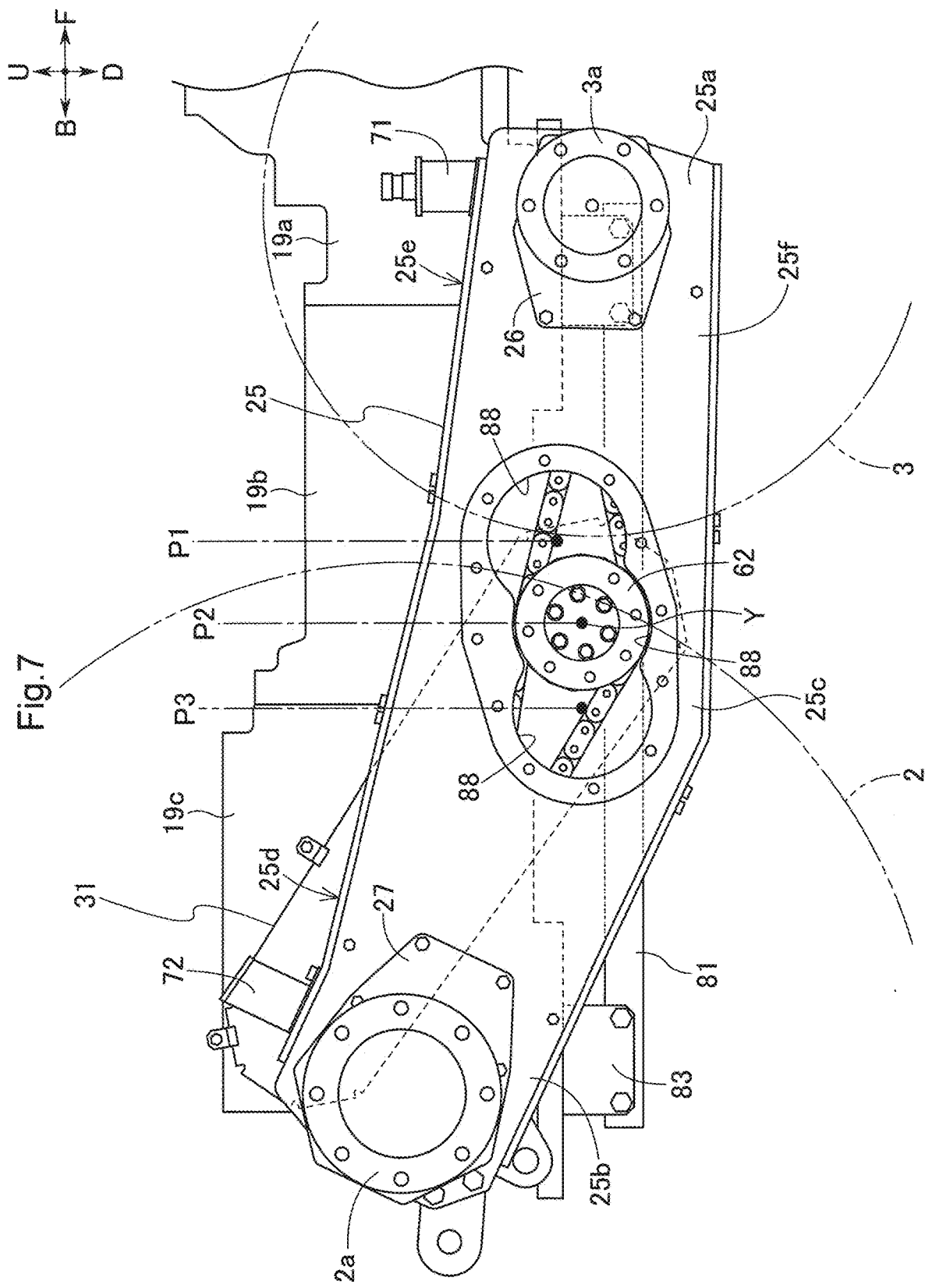
FIG. 7 is a side view illustrating a retention frame with no cover as viewed from the right side.
Figure 9:
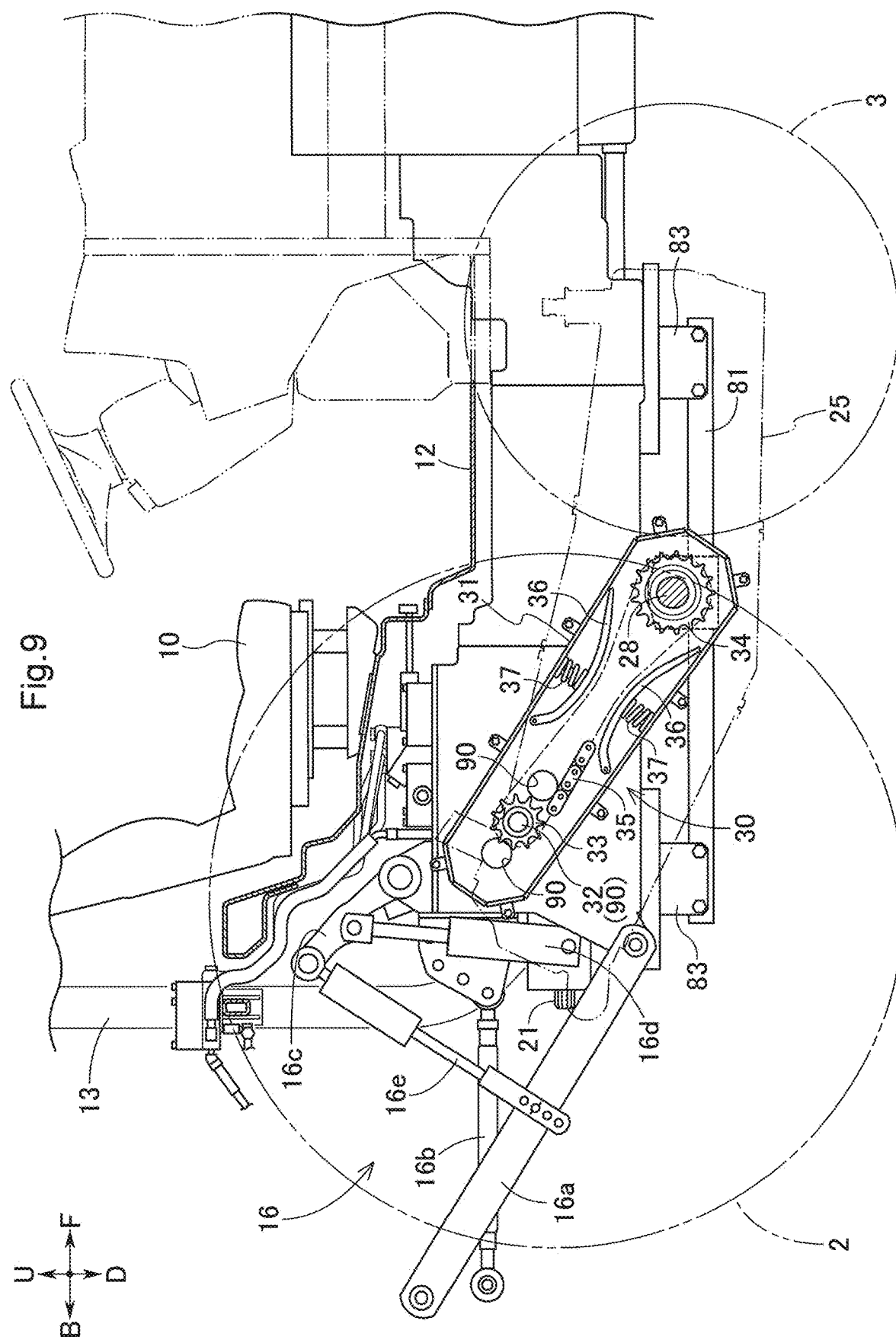
FIG. 9 is a side view illustrating the upstream transmission.

As illustrated in FIGS. 1, 6, the vehicle body frame 15 includes the engine 6, a transmission 17 extending rearward from a rear portion of the engine 6, and a front frame 18 extending forward from a lower portion of the engine 6. The transmission 17 includes a transmission case 19. A travel transmission (not illustrated), a rear-wheel differential mechanism 20 (see FIG. 6), and a work transmission (not illustrated) are provided inside the transmission case 19. The travel transmission receives a driving force from the engine 6 as a drive source via a main clutch (not illustrated). The rear-wheel differential mechanism 20 receives an output from the travel transmission. The work transmission receives a driving force from the engine 6. As illustrated in FIGS. 5, 9, a power extraction shaft 21 is provided rearward of the transmission case 19. The power extraction shaft 21 is coupled to an input shaft (not illustrated) of a work device. The power extraction shaft 21 extracts power from the work transmission and transmits the power to the work device. As illustrated in FIGS. 6, 7, and so on, the transmission case 19 is dividable into a front case portion 19a, an intermediate case portion 19b, and a rear case portion 19c. The front case portion 19a is coupled to the engine 6. The intermediate case portion 19b extends rearward from the rearward of the front case portion 19a. The rear case portion 19c extends rearward from the rearward of the intermediate case portion 19b.

As illustrated in FIGS. 2, 9, and so on, the coupler 16 includes lower links 16a, a top link 16b, and lift arms 16c. The lower links 16a are coupled to respective lateral sides of a rear portion of the transmission case 19 so as to be vertically swingable. The top link 16b is disposed above the lower links 16a and coupled to the transmission case 19 so as to be vertically swingable. The lift arms 16c are coupled to respective lateral sides of an upper portion of the transmission case 19 so as to be vertically swingable. The lift arm 16c is coupled to the lower link 16a via a lift rod 16e. In this example embodiment, a right lift rod 16e includes a rolling hydraulic cylinder.

When right and left lower links 16a and the top link 16b of the coupler 16 are each coupled to the work device, the work device is tractably coupled to the vehicle body 4. When right and left lift arms 16c are operated to swing vertically due to expansion and contraction of respective hydraulic cylinders 16d, the lower links 16a are operated by respective lift arms 16c to swing vertically via respective lift rods 16e. As a result, the work device is lifted and lowered. When the right lower link 16a swings due to expansion and contraction of the rolling hydraulic cylinder, a rolling operation of the work device is performed.

As illustrated in FIGS. 5, 6, a front axle case 23 including a front axle 1a is provided in each end of a front wheel drive case 22 extending in the vehicle-body width direction, under the front frame 18. The front wheel 1 is held by the front axle 1a. The front wheel drive case 22 is coupled to the front frame 18 so as to be swingable vertically around a rolling axis X as a swing pivot which rolling axis X is at a central portion of the front wheel drive case 22 in the vehicle-body width direction and extends along the vehicle-body front-rear direction. The right and left front wheels 1 are held by the vehicle body frame 15 via respective front axle cases 23 and the front wheel drive case 22. The right and left front wheels 1 are rollable around the rolling axis X relative to the vehicle body frame 15.

The front axle case 23 is coupled to the front wheel drive case 22 so as to be swingable around a steering axis as a swing pivot which steering axis extends in the vehicle-body up-down direction. When the steering wheel 11 is rotated, the front axle case 23 swings around the steering axis relative to the front wheel drive case 22. As a result, the right and left front wheels 1 are steered to right and left.

As illustrated in FIG. 5, a rotating shaft 24 is extended forward from the transmission 17 and is coupled to the front wheel drive case 22. Power from the engine 6 as a drive source is input into the travel transmission of the transmission 17. The power is input into a front-wheel differential mechanism (not illustrated) inside the front wheel drive case 22 via the rotating shaft 24 and is transmitted from the front-wheel differential mechanism to right and left front axles 1a. As a result, the right and left front wheels 1 are driven.

The right and left intermediate wheels 3 are supported by the vehicle body frame 15 based on the same support structure and are driven based on the same drive structure. The right and left rear wheels 2 are supported by the vehicle body frame 15 based on the same support structure and are driven based on the same drive structure. In the following description, in order to describe the support structure and the drive structure for the right and left intermediate wheels 3, the support structure and the drive structure for the right and left rear wheels 2, and so on, the right and left front wheels 1 are just referred to as the front wheel 1, the right and left intermediate wheels 3 are just referred to as the intermediate wheel 3, and the right and left rear wheels 2 are just referred to as the rear wheel 2.

As illustrated in FIGS. 1, 2, the intermediate wheel 3 is between the front wheel 1 and the rear wheel 2. The front wheel 1, the intermediate wheel 3, and the rear wheel 2 are arranged in the vehicle-body front-rear direction. The intermediate wheel 3 is placed within the width of the front wheel 1 and within the width of the rear wheel 2 in a region between the front wheel 1 and the rear wheel 2. In this example embodiment, the intermediate wheel 3 is placed within the width of the front wheel 1 and within the width of the rear wheel 2 but is not limited to this, and the intermediate wheel 3 may project laterally outwardly or laterally inwardly in the vehicle-body width direction from both or either of the front wheel 1 and the rear wheel 2. The intermediate wheel 3 has an outside diameter smaller than the outside diameter of the rear wheel 2. The outside diameter of the intermediate wheel 3 is smaller than the outside diameter of the front wheel 1. The outside diameter of the rear wheel 2 is larger than the outside diameter of the intermediate wheel 3 and is larger than the outside diameter of the front wheel 1. The outside diameter of the front wheel 1, the outside diameter of the intermediate wheel 3, and the outside diameter of the rear wheel 2 each include a rubber lug portion provided in an outer peripheral portion of a tire.

As illustrated in FIGS. 1, 2, 4, 5, and so on, a retention frame 25 is provided laterally outward of the vehicle body frame 15. The intermediate wheel 3 and the rear wheel 2 are held by the vehicle body frame 15 via the retention frame 25. The retention frame 25 holds the intermediate wheel 3 such that the intermediate wheel 3 is rotatable, and the retention frame 25 also holds the rear wheel 2 such that the rear wheel 2 is rotatable.

Figure 3:
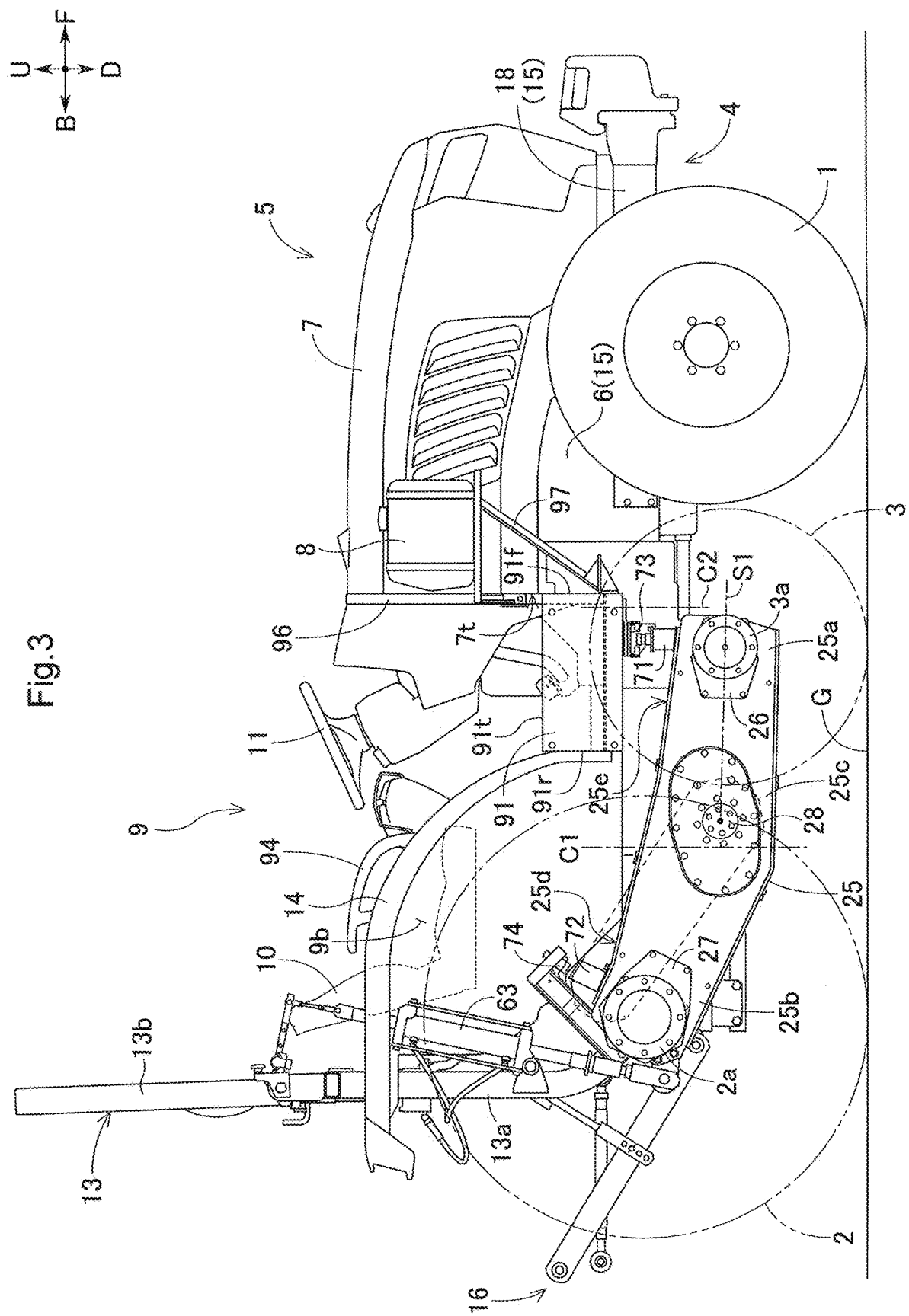
FIG. 3 is a side view of the tractor viewed from the right side with intermediate wheels being grounded.

More specifically, as illustrated in FIGS. 3, 5, an intermediate axle case 26 is provided for an intermediate wheel holder 25a in a front portion of the retention frame 25. The intermediate axle case 26 includes an intermediate axle 3a. The intermediate axle case 26 is attached to the intermediate wheel holder 25a. As a result, the intermediate axle 3a is provided for the intermediate wheel holder 25a. Since the intermediate wheel 3 is held by the intermediate axle 3a, the intermediate wheel 3 is held by the intermediate wheel holder 25a so as to be rotatable and drivable.

As illustrated in FIGS. 3, 5, a rear axle case 27 is provided for a wheel holder 25b in a rear portion of the retention frame 25. The rear axle case 27 includes a rear axle 2a. The rear axle case 27 is attached to the wheel holder 25b. As a result, the rear axle 2a is provided for the wheel holder 25b. Since the rear wheel 2 is held by the rear axle 2a, the rear wheel 2 is held by the wheel holder 25b so as to be rotatable and drivable.

As illustrated in FIGS. 3, 5, a pivot shaft 28 extending in the vehicle-body width direction is attached to an intermediate portion 25c of the retention frame 25 which intermediate portion 25c is placed between the intermediate wheel holder 25a holding the intermediate wheel 3 and the wheel holder 25b (a rear wheel holder) holding the rear wheel 2. The pivot shaft 28 is coupled to the vehicle body frame 15. The retention frame 25 is held by the vehicle body frame 15 via the pivot shaft 28.

As illustrated in FIG. 5, the pivot shaft 28 couples a left retention frame 25 holding the left intermediate wheel 3 and the left rear wheel 2 and a right retention frame 25 holding the right intermediate wheel 3 and the right rear wheel 2 to the vehicle body frame 15 on the same pivot shaft axis Y. That is, a shaft that couples the left retention frame 25 to the vehicle body frame 15 and a shaft that couples the right retention frame 25 to the vehicle body frame 15 are the same pivot shaft 28.

As illustrated in FIGS. 3, 7, the retention frame 25 is positioned in an inclined manner such that the position of a wheel adjacent portion 25d extending rearward toward the wheel holder 25b from the intermediate portion 25c in a side view of the vehicle body is higher than the position of an intermediate-wheel adjacent portion 25e extending forward toward the intermediate wheel holder 25a from the intermediate portion 25c, and the wheel adjacent portion 25d becomes higher as it extends away from the intermediate portion 25c. In this example embodiment, the intermediate-wheel adjacent portion 25e is a front portion extending forward from the intermediate portion 25c, and the wheel adjacent portion 25d is a rear portion extending upward toward the rear side from the intermediate portion 25c. While the intermediate wheel 3 and the rear wheel 2 are grounded, the retention frame 25 supports the intermediate wheel 3 and the rear wheel 2 having an axle center placed higher than the axle center of the intermediate wheel 3. Thus, the retention frame 25 has a shape without any useless portion, so that it is possible to reduce the component cost of the retention frame 25.

As illustrated in FIGS. 2, 3, the retention frame 25 extends in the front-rear direction below the rear-wheel fender 14 while the retention frame 25 overlaps with the rear-wheel fender 14 in a plan view. The retention frame 25 is illustrated with a broken line in FIG. 2. As seen in FIG. 2 and FIGS. 1, 3, a front end portion of the retention frame 25 does not overlap with the rear-wheel fender 14, and other portions (a rear portion) of the retention frame 25 including its rear end but excluding the front end portion overlaps with the rear-wheel fender 14. The front end portion of the retention frame 25 overlaps with the step 12 of the operation section 9. The retention frame 25 is laterally outward of the vehicle body frame 15 in such manner as to be not too far away from the vehicle body frame 15. This can restrain the width of the vehicle body from being too wide.

As illustrated in FIG. 3, the retention frame 25 extends in the front-rear direction below the operation section 9 in a side view of the vehicle body. The retention frame 25 is illustrated with a solid line in FIG. 3. As illustrated in FIG. 3, in a side view of the vehicle body, the front end of the retention frame 25 is below the steering wheel 11, and the rear end of the retention frame 25 is below the operation seat 10 of the operation section 9. The right and left retention frames 25 are each illustrated with a broken line in FIG. 2. As illustrated in FIG. 2, the steering wheel 11 and the operation seat 10 are between the right and left retention frames 25 in a plan view.

As illustrated in FIGS. 3, 5, the retention frame 25 is disposed such that a center C1 of the retention frame 25 in the front-rear direction is rearward of a center C2 of the vehicle body frame 15 in the front-rear direction. In this example embodiment, as illustrated in FIG. 3, the front end of the retention frame 25 is rearward of the center C2 of the vehicle body frame 15 in the front-rear direction. However, the present invention is not limited to this, and the front end of the retention frame 25 may be forward of the center C2 of the vehicle body frame 15 in the front-rear direction.

As illustrated in FIGS. 2, 5, the retention frame 25 extends in the front-rear direction in a space between the rear wheel 2 and the transmission case 19. The retention frame 25 also extends in the front-rear direction in a space between the intermediate wheel 3 and the vehicle body frame 15. As illustrated in FIGS. 5, 6, the retention frame 25 is between the intermediate axle case 26 and the transmission case 19 and between the rear axle case 27 and the transmission case 19, in a plan view. The rear wheel 2 is laterally outward of the retention frame 25, and the transmission case 19 is laterally inward of the retention frame 25. Accordingly, the rear wheel 2 can be utilized as an outer guard to protect the retention frame 25 from a laterally outer side, and the transmission case 19 can be utilized as an inner guard to protect the retention frame 25 from a laterally inner side.

As illustrated in FIGS. 2, 5, the retention frame 25 is inward of the intermediate wheel 3 and the rear wheel 2 in the vehicle-body width direction. As illustrated in FIGS. 5, 6, the intermediate axle 3a and the rear axle 2a are outward of the retention frame 25 in the vehicle-body width direction. The intermediate wheel 3 and the rear wheel 2 are attachable to and detachable from the retention frame 25 from the laterally outward of the vehicle body. Accordingly, the intermediate wheel 3 and the rear wheel 2 can be easily attached and detached.

When the transmission 17 receives power from the engine 6 as a drive source or a power source, the transmission 17 transmits the power to the intermediate wheel 3 and the rear wheel 2. As a result, the intermediate wheel 3 and the rear wheel 2 are driven. As illustrated in FIG. 6, the transmission 17 includes an intermediate-wheel power transmission 41 configured to transmit power to the intermediate wheel 3, and a wheel power transmission 51 (a rear-wheel power transmission) configured to transmit power to the rear wheel 2. The intermediate-wheel power transmission 41 and the wheel power transmission 51 are provided inside the retention frame 25.

More specifically, as illustrated in FIG. 6, an upstream transmission 30 is provided over a lateral portion of the transmission 17 and the pivot shaft 28. A first downstream transmission 40 is provided over the pivot shaft 28 and the intermediate axle 3a. A second downstream transmission 50 is provided over the pivot shaft 28 and the rear axle 2a. The retention frame 25 serves as a power transmission case configured to store the intermediate-wheel power transmission 41 and the wheel power transmission 51 (the rear-wheel power transmission). Accordingly, the retention frame 25 is also used as the power transmission case, thus making it possible to reduce the number of components and to achieve an inexpensive configuration.

As illustrated in FIGS. 6, 9, the upstream transmission 30 includes a power transmission case 31. The power transmission case 31 is inward of the retention frame 25, over a lateral portion of the transmission case 19 and the pivot shaft 28. The power transmission case 31 includes a power transmission 33 provided for an output shaft 32 of the transmission 17, an input section 34 (see FIG. 10) rotatably provided for the pivot shaft 28, and an interlocking structure 35 configured to operate the power transmission 33 and the input section 34 in conjunction with each other.

In this example embodiment, as illustrated in FIGS. 6, 9, the output shaft 32 is an output shaft of the rear-wheel differential mechanism 20. The power transmission 33 and the input section 34 include chain sprockets. The interlocking structure 35 includes an endless roller chain. Respective tension operating structures 36 are provided outward of a portion of the endless roller chain which portion extends from the power transmission 33 to the input section 34 and outward of a portion of the endless roller chain which portion extends from the input section 34 to the power transmission 33. The tension operating structure 36 is swingably held by the power transmission case 31 and is pressed against the endless roller chain by a spring 37 so as to bias the endless roller chain toward a tensed side. In this example embodiment, the spring 37 is provided. However, the tension operating structure 36 may include a bent round bar material, a plastic tensioner, or the like as a structure having elasticity to press the endless roller chain, for example, and thus, the spring 37 may not be provided.

In the upstream transmission 30, power transmitted from the transmission 17 to the power transmission 33 is transmitted to the input section 34 from the power transmission 33 via the interlocking structure 35. In this example embodiment, the endless roller chain of the interlocking structure 35 is maintained in a tensed state necessary for power transmission by the tension operating structures 36.

Figure 8:
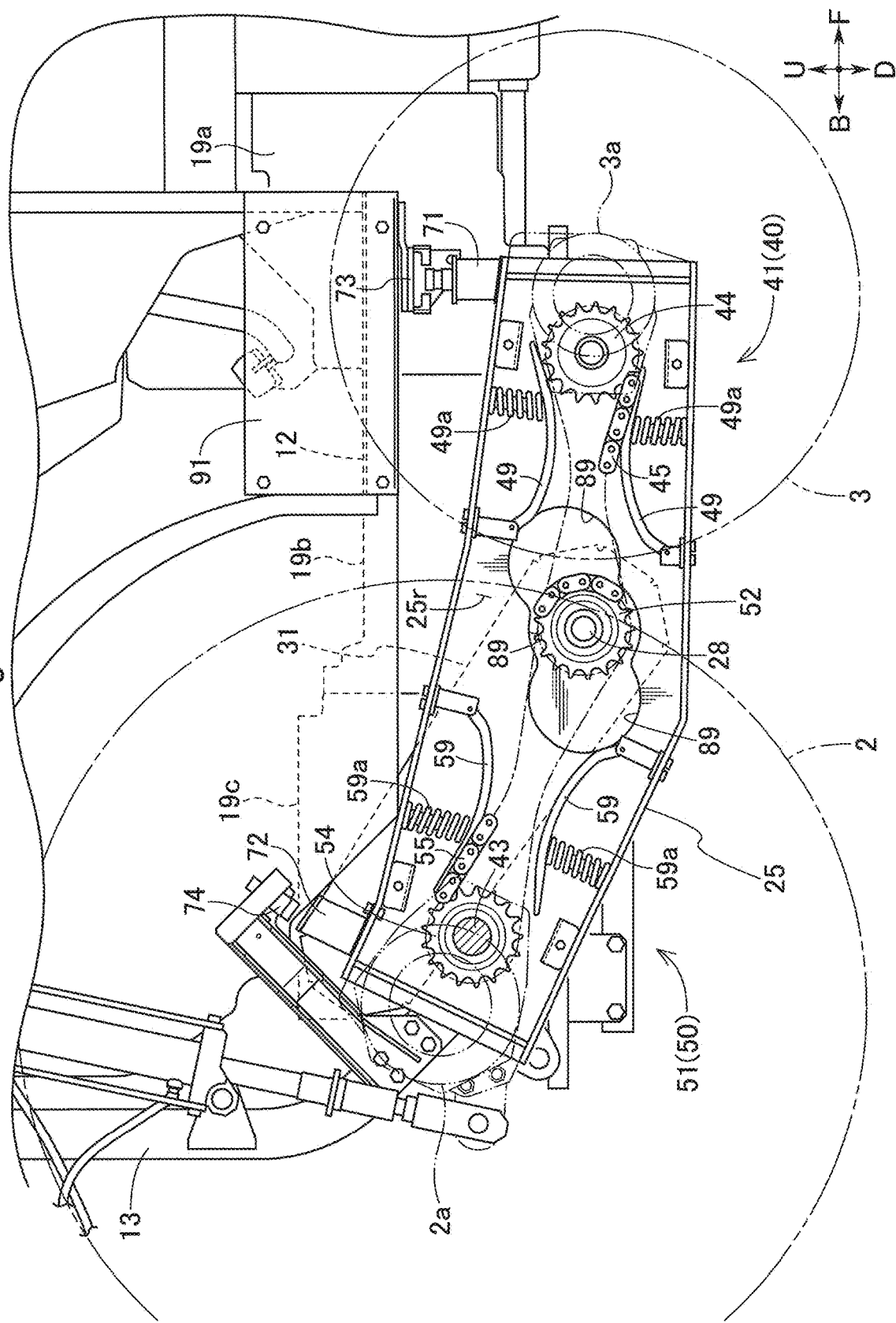
FIG. 8 is a side view illustrating the wheel power transmission and the intermediate-wheel power transmission.

As illustrated in FIGS. 6, 8, the first downstream transmission 40 is provided with the retention frame 25 and the intermediate axle case 26. The power transmitted from the transmission 17 to the input section 34 by the upstream transmission 30 is transmitted to the intermediate wheel 3 via the retention frame 25 and the intermediate axle case 26.

More specifically, as illustrated in FIGS. 6, 8, the first downstream transmission 40 includes the intermediate-wheel power transmission 41 provided over the retention frame 25 and the intermediate axle case 26.

As illustrated in FIGS. 6, 8, the intermediate-wheel power transmission 41 is provided over the inside of the retention frame 25 and the inside of the intermediate axle case 26. The intermediate-wheel power transmission 41 includes a first transmission wheel body 42 on the pivot shaft side, a transmission wheel body 44 on the intermediate wheel side, an endless roller transmission body 45, and an intermediate-wheel gear transmission section 46. The first transmission wheel body 42 on the pivot shaft side is rotatably provided for the pivot shaft 28. The transmission wheel body 44 on the intermediate wheel side is provided for an input shaft 43 of the intermediate axle case 26. The endless roller transmission body 45 is wound on the first transmission wheel body 42 on the pivot shaft side and the transmission wheel body 44 on the intermediate wheel side. The intermediate-wheel gear transmission section 46 is provided over the input shaft 43 of the intermediate axle case 26 and the intermediate axle 3a.

As illustrated in FIG. 8, respective tension operating structures 49 are provided outward of a portion of the endless roller transmission body 45 which portion extends from the first transmission wheel body 42 to the transmission wheel body 44 and outward of a portion of the endless roller transmission body 45 which portion extends from the transmission wheel body 44 to the first transmission wheel body 42. The tension operating structure 49 is swingably held by the retention frame 25 and is pressed against the endless roller transmission body 45 by a biasing mechanism 49a so as to bias the endless roller transmission body 45 toward a tensed side. In this example embodiment, the first transmission wheel body 42 on the pivot shaft side and the transmission wheel body 44 on the intermediate wheel side are chain sprockets. The endless roller transmission body 45 is an endless roller chain. The biasing mechanism 49a is a spring. In this example embodiment, the biasing mechanism 49a is provided. However, the tension operating structure 49 may use a bent round bar material, a plastic tensioner, or the like as a structure having elasticity to press the endless roller chain, for example, and thus, the biasing mechanism 49a may not be provided.

Figure 10:
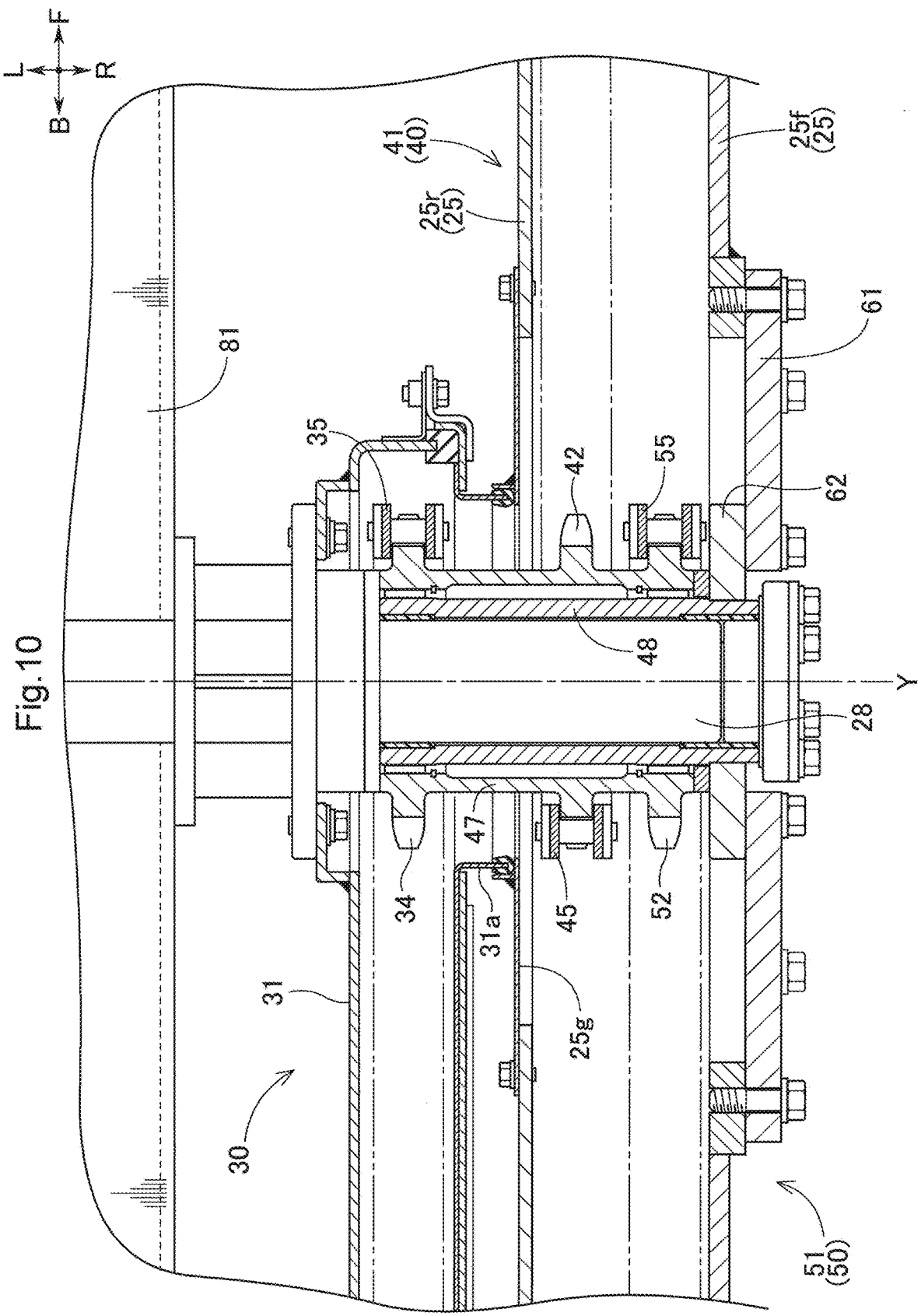
FIG. 10 is a sectional view of an attachment structure for the retention frame.

As illustrated in FIG. 10, the first transmission wheel body 42 is coupled to the input section 34 via a cylindrical boss 47. A structure to attach the first transmission wheel body 42 to the pivot shaft 28 and a structure to attach the input section 34 to the pivot shaft 28 are constituted by the same cylindrical boss 47. An intermediate tube 48 is provided between the cylindrical boss 47 and the pivot shaft 28. The intermediate tube 48 is fixed to an annular coupler 62 and positions the cylindrical boss 47 relative to the pivot shaft 28. The intermediate tube 48 is fixed to the annular coupler 62 by welding.

In the first downstream transmission 40, the power transmitted from the transmission 17 to the input section 34 is transmitted to the intermediate axle 3a via the intermediate-wheel power transmission 41. The power from the input section 34 is transmitted to the first transmission wheel body 42 of the intermediate-wheel power transmission 41. This power is transmitted to the intermediate axle 3a via the endless roller transmission body 45, the transmission wheel body 44, and the intermediate-wheel gear transmission section 46.

As illustrated in FIG. 6, the intermediate-wheel gear transmission section 46 includes an input shaft gear 46a held by the input shaft 43 of the intermediate axle case 26, and an intermediate axle gear 46b held by the intermediate axle 3a. The input shaft gear 46a is engaged with the intermediate axle gear 46b. The power from the input section 34 is transmitted to the input shaft 43 of the intermediate-wheel gear transmission section 46 (the intermediate axle case 26). This power is output to the intermediate axle 3a via the input shaft gear 46a and the intermediate axle gear 46b in the intermediate-wheel gear transmission section 46. The rotation direction of the intermediate axle 3a is changed to a rotation direction reverse to the rotation direction of the input shaft 43 by the input shaft gear 46a and the intermediate axle gear 46b in the intermediate-wheel gear transmission section 46. The intermediate axle gear 46b has a gear diameter larger than the gear diameter of the input shaft gear 46a. The endless roller transmission body 45 is maintained in a tensed state necessary for power transmission by the tension operating structure 49.

As illustrated in FIGS. 6, 8, the second downstream transmission 50 is provided with the retention frame 25 and the rear axle case 27. The power from the transmission 17 is transmitted to the input section 34 via the upstream transmission 30. This power is transmitted to the rear wheel 2 via the retention frame 25 and the rear axle case 27.

More specifically, as illustrated in FIGS. 6, 8, the second downstream transmission 50 includes the wheel power transmission 51 provided over the retention frame 25 and the rear axle case 27.

As illustrated in FIGS. 6, 8, the wheel power transmission 51 is provided over the inside of the retention frame 25 and the inside of the rear axle case 27. The wheel power transmission 51 includes a second transmission wheel body 52 on the pivot shaft side, a transmission wheel body 54 on the wheel side, an endless roller transmission body 55, and a wheel gear transmission section 56. The second transmission wheel body 52 on the pivot shaft side is rotatably provided for the pivot shaft 28. The transmission wheel body 54 on the wheel side is provided for an input shaft 53 of the rear axle case 27. The endless roller transmission body 55 is wound on the second transmission wheel body 52 on the pivot shaft side and the transmission wheel body 54 on the wheel side. The wheel gear transmission section 56 is provided over the input shaft 53 of the rear axle case 27 and the rear axle 2a.

As illustrated in FIG. 8, respective tension operating structures 59 are provided outward of a portion of the endless roller transmission body 55 which portion extends from the second transmission wheel body 52 to the transmission wheel body 54 and outward of a portion of the endless roller transmission body 55 which portion extends from the transmission wheel body 54 to the second transmission wheel body 52. The tension operating structure 59 is swingably held by the retention frame 25 and is pressed against the endless roller transmission body 55 by a biasing mechanism 59a so as to bias the endless roller transmission body 55 toward a tensed side. In this example embodiment, the second transmission wheel body 52 on the pivot shaft side and the transmission wheel body 54 on the wheel side are chain sprockets. The endless roller transmission body 55 is an endless roller chain. The biasing mechanism 59a is a spring. In this example embodiment, the biasing mechanism 59a is provided. However, the tension operating structure 59 may use a bent round bar material, a plastic tensioner, or the like as a structure having elasticity to press the endless roller chain, for example, and thus, the biasing mechanism 59a may not be provided.

As illustrated in FIG. 10, the second transmission wheel body 52 is coupled to the input section 34 via the cylindrical boss 47. A structure to attach the second transmission wheel body 52 to the pivot shaft 28 and a structure to attach the input section 34 to the pivot shaft 28 are defined by the same cylindrical boss 47.

As illustrated in FIG. 6, in the second downstream transmission 50, the power transmitted from the transmission 17 to the input section 34 is transmitted to the rear axle 2a via the wheel power transmission 51. The wheel gear transmission section 56 includes an input shaft gear 56a held by the input shaft 53 of the rear axle case 27, and a rear axle gear 56b held by the rear axle 2a. The input shaft gear 56a is engaged with the rear axle gear 56b. The power from the input section 34 is output to the rear axle 2a via the second transmission wheel body 52, the endless roller transmission body 55, the transmission wheel body 54, and the wheel gear transmission section 56. The rotation direction of the rear axle 2a is changed to a rotation direction reverse to the rotation direction of the input shaft 53 by the input shaft gear 56a and the rear axle gear 56b in the wheel gear transmission section 56. The rear axle gear 56b has a gear diameter larger than the gear diameter of the input shaft 56a. The endless roller transmission body 55 is maintained in a tensed state necessary for power transmission by the tension operating structure 59.

As illustrated in FIG. 6, respective brakes 60 are provided for right and left output shafts 32 of the transmission 17 inside the transmission case 19. The output shaft 32 is an output shaft of the rear-wheel differential mechanism 20. In this example embodiment, right and left brakes 60 are multi-disc friction brakes. The right and left brakes 60 can brake the output shafts 32. When the output shafts 32 are braked, respective power transmissions 33 are braked. When the power transmission 33 is braked, a braking force applied to the power transmission 33 is transmitted to the intermediate axle 3a via the upstream transmission 30 and the intermediate-wheel power transmission 41. When the power transmission 33 is braked, a braking force applied to the power transmission 33 is transmitted to the rear axle 2a via the upstream transmission 30 and the wheel power transmission 51. The power transmission 33 is braked by the brake 60, so that the intermediate wheel 3 and the rear wheel 2 are braked. When the brake 60 is just operated to ON, the intermediate wheel 3 and the rear wheel 2 can be braked.

As illustrated in FIGS. 7, 10, in the intermediate portion 25c of the retention frame 25, the annular coupler 62 is coupled to an outer wall portion 25f of the retention frame 25 via a cover 61 (described later). The intermediate tube 48 is outwardly engaged to the pivot shaft 28 so as to be rotatable. The annular coupler 62 is coupled to the intermediate tube 48. A coupling section 25g is provided for an inner wall portion 25r of the retention frame 25. An end portion 31a is held by the pivot shaft 28 in the power transmission case 31. The coupling section 25g is coupled to the end portion 31a so as to be rotatable. The intermediate portion 25c of the retention frame 25 is coupled to the pivot shaft 28 so as to be rotatable via the cover 61, the annular coupler 62, the intermediate tube 48, and the power transmission case 31. That is, the retention frame 25 is held by the vehicle body frame 15 so as to be vertically swingable around a pivot shaft axis Y of the pivot shaft 28 as a swing pivot which pivot shaft axis Y extends in the vehicle-body width direction. The pivot shaft 28 extends in the vehicle-body width direction of the vehicle body frame 15 and is attached to the retention frame 25 so as to couple the retention frame 25 to the vehicle body frame 15 in such a manner that the retention frame 25 is vertically swingable. With the configuration in which the pivot shaft 28 is coupled to the vehicle body frame 15, the retention frame 25 can be by the vehicle body frame 15 so as to be vertically swingable with an inexpensive configuration.

Figure 13:
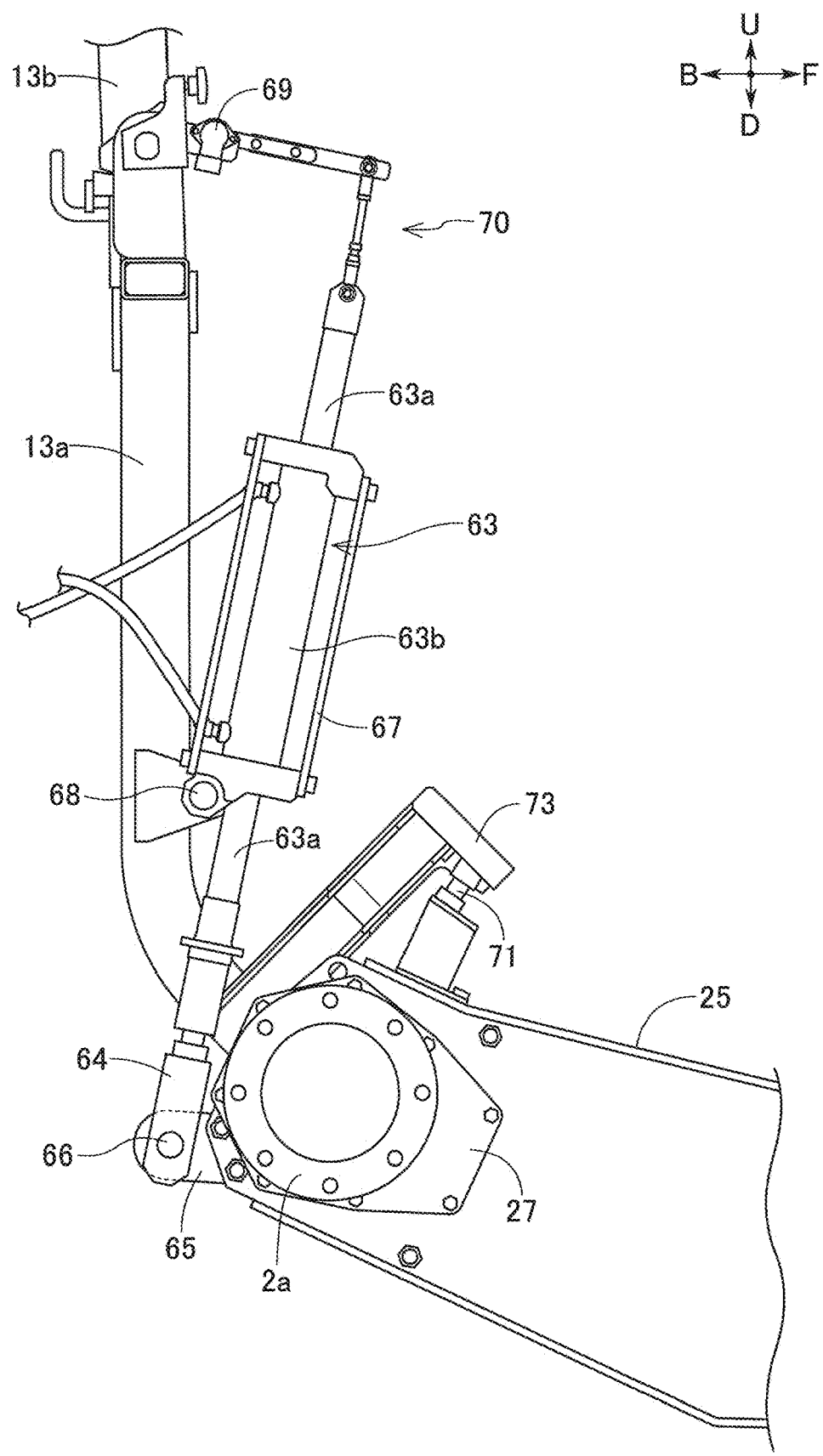
FIG. 13 is a side view of a retention frame swinging structure.
Figure 14:
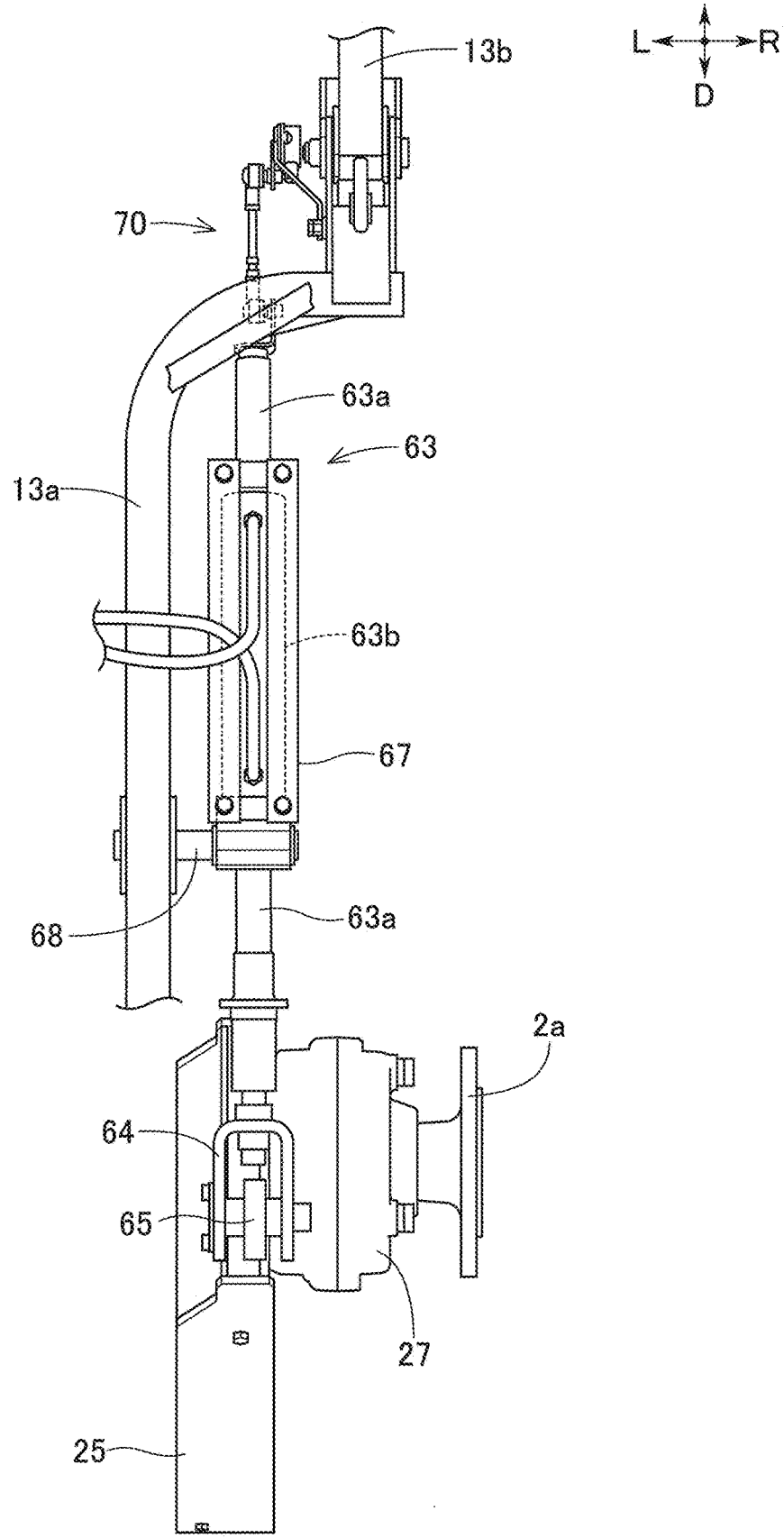
FIG. 14 is a rear view of the retention frame swinging structure.

As illustrated in FIGS. 3, 13, 14, a hydraulic cylinder 63 is coupled to the rear portion of the retention frame 25, so that the hydraulic cylinder 63 as an actuator can swing the retention frame 25.

More specifically, as illustrated in FIGS. 13, 14, in this example embodiment, the hydraulic cylinder 63 includes a piston rod 63a and a cylinder tube 63b. The piston rod 63a is a double rod cylinder projecting from both ends of the cylinder tube 63b. A coupler 64 having a forked shape is provided for a lower portion of the piston rod 63a. A cylinder coupler 65 is provided for the rear portion of the retention frame 25. The coupler 64 is coupled to the cylinder coupler 65 via a coupling pin 66. The piston rod 63a and the retention frame 25 operate in conjunction with each other via the coupler 64, the coupling pin 66, and the cylinder coupler 65. The cylinder tube 63b is provided with a tube guard 67. The ROPS 13 includes a column support 13a provided with a support shaft 68. The tube guard 67 is coupled to the support shaft 68. The ROPS 13 includes the column support 13a and an upper ROPS portion 13b. The column support 13a is fixed to both lateral portions of the vehicle body frame 15. The upper ROPS portion 13b is coupled to right and left column supports 13a so as to be switchable between an upright posture and a laid-down posture. The cylinder tube 63b is supported by the column support 13a via the tube guard 67 and the support shaft 68.

As illustrated in FIG. 2, a portion of the piston rod 63a that projects upward from the cylinder tube 63b extends through an opening of the rear-wheel fender 14. An upper portion of the piston rod 63a projects upward from the rear-wheel fender 14. As illustrated in FIG. 13, the portion of the piston rod 63a which portion projects upward from the cylinder tube 63b is coupled to a potentiometer 69 held by the column support 13a of the ROPS 13 via a link mechanism 70. The potentiometer 69 detects an elevating stroke of the piston rod 63a as a swing stroke of the retention frame 25.

The hydraulic cylinder 63 presses down the cylinder coupler 65 in response to the piston rod 63a being lowered. As a result, the wheel adjacent portion 25d of the retention frame 25 is lowered. In this state, the hydraulic cylinder 63 swings the retention frame 25 to lift the intermediate-wheel adjacent portion 25e relative to the vehicle body frame 15. The hydraulic cylinder 63 lifts the cylinder coupler 65 in response to the piston rod 63a being lifted. As a result, the wheel adjacent portion 25d is lifted. In this state, the hydraulic cylinder 63 swings the retention frame 25 to lower the intermediate-wheel adjacent portion 25e relative to the vehicle body frame 15.

The hydraulic cylinder 63 can swing the retention frame 25. Accordingly, it is possible to easily switch the retention frame 25 by power of the hydraulic cylinder 63 between a state where the intermediate wheel 3 and the rear wheel 2 are grounded and a state where the intermediate wheel 3 is ungrounded.

As illustrated in FIGS. 3, 7, a first positioning section 71 is provided for an upper portion of the intermediate-wheel adjacent portion 25e of the retention frame 25. A second positioning section 72 is also provided for an upper portion of the wheel adjacent portion 25d of the retention frame 25. Besides, as illustrated in FIGS. 3, 8, the vehicle body frame 15 is provided with a first stopper 73 and a second stopper 74. When the wheel adjacent portion 25d of the retention frame 25 is lowered, the intermediate-wheel adjacent portion 25e is lifted to cause the first positioning section 71 to abut with the first stopper 73, so that a lowering limit of the wheel adjacent portion 25d and a lifting limit of the intermediate-wheel adjacent portion 25e are determined. When the intermediate-wheel adjacent portion 25e of the retention frame 25 is lowered, the wheel adjacent portion 25d is lifted to cause the second positioning section 72 to abut with the second stopper 74, so that a lowering limit of the intermediate-wheel adjacent portion 25e and a lifting limit of the wheel adjacent portion 25d are determined. The first positioning section 71, the second positioning section 72, the first stopper 73, and the second stopper 74 determine the swing stroke by which the retention frame 25 is swingable.

Figure 15:
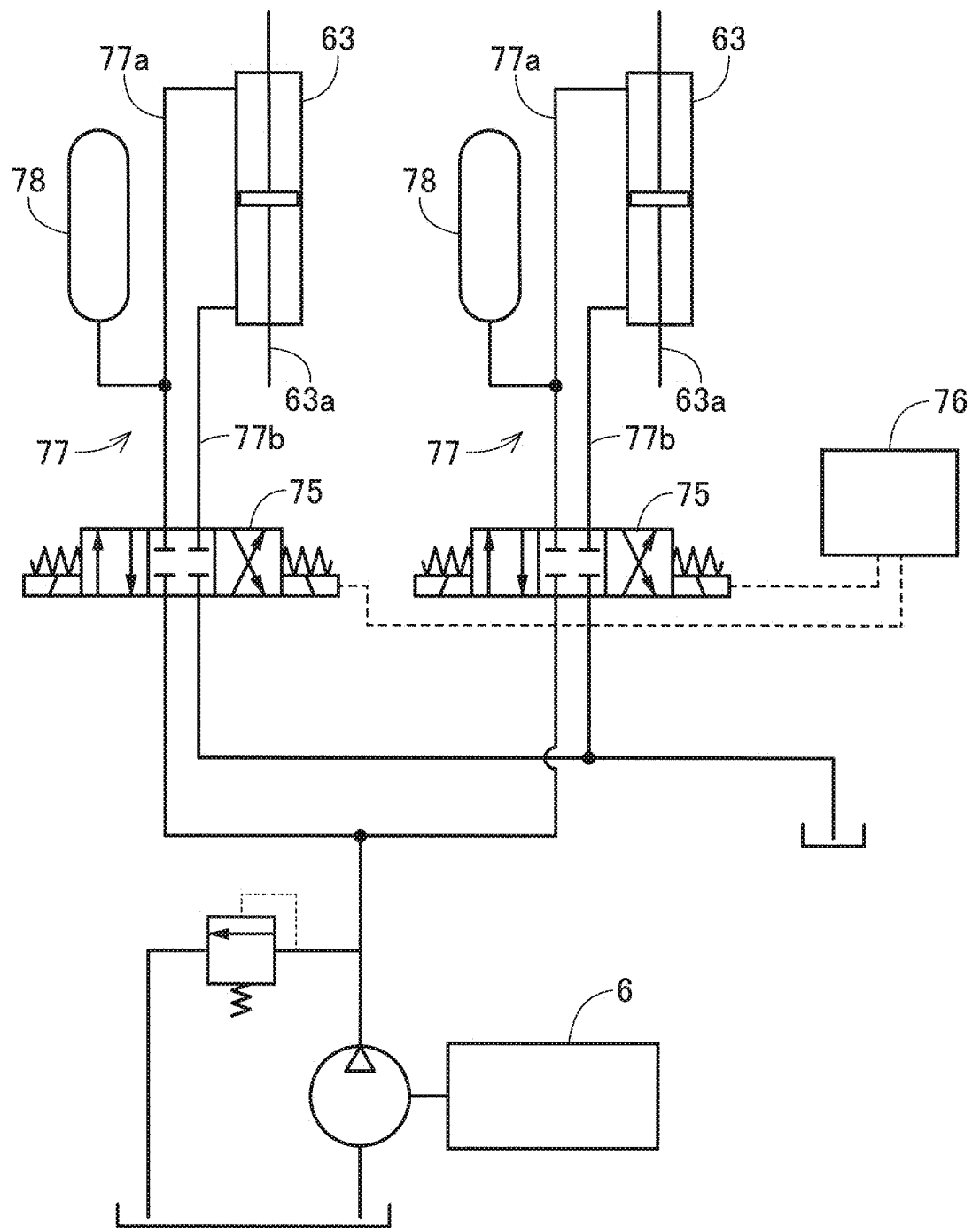
FIG. 15 is a hydraulic circuit diagram of a hydraulic cylinder.

As illustrated in FIG. 15, an operating device 76 is linked to respective operating valves 75 of the left hydraulic cylinder 63 configured to swing the left retention frame 25 and the right hydraulic cylinder 63 configured to swing the right retention frame 25. When the operating device 76 is manually operated, switching of the operating valves 75 of the right and left hydraulic cylinders 63 is performed. In this example embodiment, an operation tool for the operating device 76 is an operation switch (not illustrated). An operating lever can be also used instead of the operation switch. Alternatively, a remote controller that can remotely operate the operating valve 75 by radio can be also used.

Figure 4:
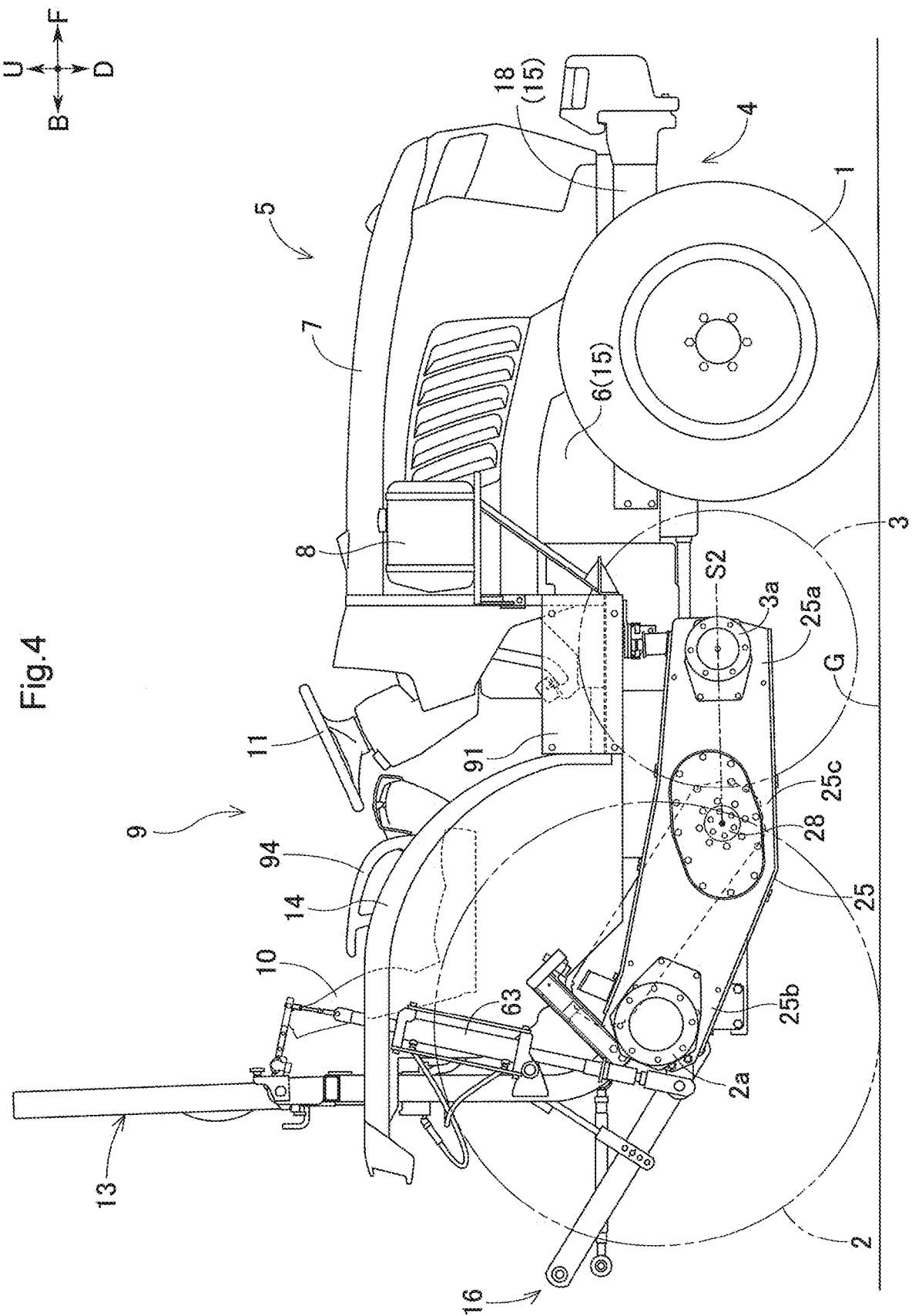
FIG. 4 is a side view of the tractor viewed from the right side with the intermediate wheels being ungrounded.

By switching the piston rod 63a between a lifting side and a lowering side in response to switching of the operating valve 75, the retention frame 25 is switched by the hydraulic cylinder 63 between a first posture S1 illustrated in FIGS. 1, 3 and a second posture S2 illustrated in FIG. 4.

As illustrated in FIGS. 1, 3, in a case where the retention frame 25 is switched to the first posture S1, the intermediate-wheel adjacent portion 25e of the retention frame 25 is lowered, so that the intermediate wheel 3 is placed on a ground G. That is, the retention frame 25 causes the intermediate wheel 3 and the rear wheel 2 to be grounded. In a case where the intermediate wheel 3 and the rear wheel 2 are grounded, the front wheel 1, the intermediate wheel 3, and the rear wheel 2 are all grounded. That is, the vehicle body travels by six wheels.

As illustrated in FIG. 4, in a case where the retention frame 25 is switched to the second posture S2, the intermediate-wheel adjacent portion 25e of the retention frame 25 is lifted, so that the intermediate wheel 3 is lifted and separated from the ground G. The retention frame 25 causes the intermediate wheel 3 to be ungrounded and the rear wheel 2 to be grounded. In a case where the intermediate wheel 3 is ungrounded and the rear wheel 2 is grounded, only the front wheel 1 and the rear wheel 2 are grounded among the front wheel 1, the intermediate wheel 3, and the rear wheel 2. That is, the vehicle body travels by four wheels.

Thus, the retention frame 25 is supported by the vehicle body frame 15 so as to be vertically swingable and allows the intermediate wheel 3 and the rear wheel 2 to vertically swing relative to the vehicle body frame 15. The vertical swinging of the retention frame 25 relative to the vehicle body frame 15 can achieve an intermediate-wheel grounded state where the intermediate wheel 3 and the rear wheel 2 are both grounded and an intermediate-wheel ungrounded state where the intermediate wheel 3 is ungrounded and the rear wheel 2 is grounded.

At the time of work travel or the like, the retention frame 25 is switched to the first posture S1, so that the vehicle body 4 is supported with the front wheel 1, the intermediate wheel 3, and the rear wheel 2 being all grounded. Accordingly, in comparison with a case where the retention frame 25 is switched to the second posture S2, in which the intermediate wheel 3 is ungrounded, the vehicle body can travel in a state where the vehicle body is less likely to skid and easily travels straight. That is, when the intermediate-wheel grounded state is established, the vehicle body travels with the intermediate wheel 3 and the rear wheel 2 (a driving wheel) being grounded and driven. In comparison with a support structure or the like of a crawler belt in a case where a crawler is used, a support structure or the like for the rear wheel 2 and the intermediate wheel 3 can be simplified.

At the time when the vehicle body turns, the retention frame 25 is switched to the second posture S2, so that only the front wheel 1 and the rear wheel 2 among the front wheel 1, the intermediate wheel 3, and the rear wheel 2 are grounded to support the vehicle body 4. This allows the vehicle body 4 to turn with a small turning resistance to be given, in comparison with a case where the retention frame 25 is switched to the first posture S1 to cause the intermediate wheel 3 to be grounded. That is, when the intermediate-wheel ungrounded state is established, the intermediate wheel 3 is ungrounded. Accordingly, in comparison with a state (the intermediate-wheel grounded state) where the front wheel 1, the intermediate wheel 3, and the rear wheel 2 are grounded, the vehicle body can turn with a small resistance to be given by grounding of the wheels.

That is, when the intermediate-wheel grounded state is established, the vehicle body can travel in such a manner that the vehicle body is less likely to skid. When the intermediate-wheel ungrounded state is established, the vehicle body can easily turn. In addition, a support structure or the like for the rear wheel 2 and the intermediate wheel 3 can be simplified and inexpensive.

In a case where the intermediate wheel 3 is switched from the grounded state to the ungrounded state in order to establish a state where the intermediate wheel 3 is ungrounded and the rear wheel 2 is grounded, the hydraulic cylinder 63 swings the wheel adjacent portion 25d of the retention frame 25 to the lowering side, so that the rear wheel 2 swings to be lowered. As a result, the pivot shaft 28 is pushed up with a ground point of the rear wheel 2 being as a reaction force point, and the rear portion of the vehicle body frame 15 is pushed up with the front axle 1a being as a swing pivot. In addition, the intermediate-wheel adjacent portion 25e of the retention frame 25 is lifted by the hydraulic cylinder 63 with the pivot shaft axis Y of the pivot shaft 28 being as a swing pivot, so that the intermediate wheel 3 is lifted. When the vehicle body frame 15 is pushed up and the intermediate wheel 3 is lifted due to swinging of the retention frame 25, the intermediate wheel 3 is lifted, so that the intermediate wheel 3 can be efficiently lifted from the ground. That is, the intermediate wheel 3 can be efficiently lifted from the ground in comparison with a case where the intermediate wheel 3 is lifted only by the swinging of the retention frame 25.

When the retention frame 25 is swung from the first posture S1 to further lower the intermediate-wheel adjacent portion 25e, the pivot shaft 28 is pushed up with a ground point of the intermediate wheel 3 being as a reaction force point, so that the rear wheel 2 is lifted and separated from the ground G. That is, only the front wheel 1 and the intermediate wheel 3 are grounded among the front wheel 1, the intermediate wheel 3, and the rear wheel 2. The retention frame 25 can swing within a swing range between a rear-wheel-floating swing posture in which the intermediate wheel 3 is lowered and grounded and the rear wheel 2 is separated from the ground G and an intermediate-wheel-floating swing posture in which the rear wheel 2 is lowered and grounded and the intermediate wheel 3 is separated from the ground G. When the retention frame 25 swings to a swing posture between the rear-wheel-floating swing posture and the intermediate-wheel-floating swing posture, the intermediate wheel 3 and the rear wheel 2 are grounded.

As illustrated in FIG. 15, an accumulator 78 is connected to a hydraulic circuit 77 connecting the hydraulic cylinder 63 to the operating valve 75. The hydraulic circuit 77 operates the hydraulic cylinder 63 in response to opening and closing of the operating valve 75. In this example embodiment, the accumulator 78 is connected to a hydraulic circuit section 77a of the hydraulic circuit 77 which hydraulic circuit section 77a operates the hydraulic cylinder 63 to lower the piston rod 63a. Even in a case where pulsation or impact pressure is applied to the hydraulic cylinder 63 due to a grounding reaction force or the like on the rear wheel 2, the pulsation or impact pressure to the hydraulic cylinder 63 is relaxed by the accumulator 78. As a result, traveling vibration is relaxed by the accumulator 78. In this example embodiment, the accumulator 78 is connected only to the hydraulic circuit section 77a that lowers the rear wheel 2 relative to the vehicle body frame 15, but the accumulator 78 may be also connected to a hydraulic circuit section 77b that lifts the rear wheel 2 relative to the vehicle body frame 15, in addition to the hydraulic circuit section 77a.

Figure 11:
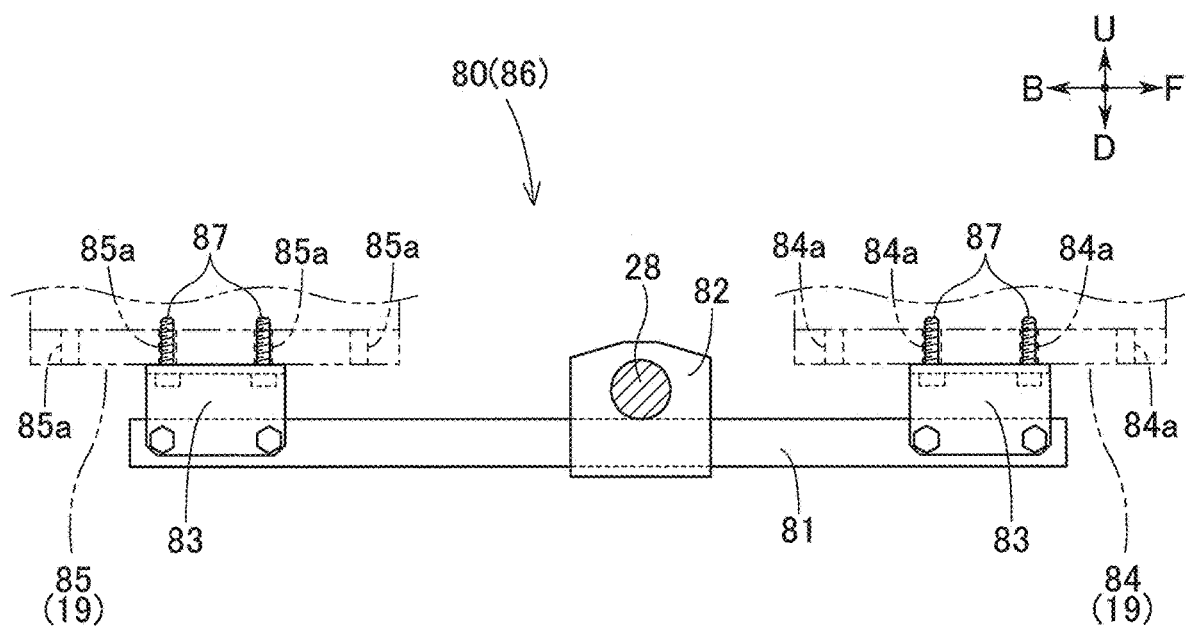
FIG. 11 is a side view of a pivot shaft change mechanism.

The pivot shaft 28 is coupled to the vehicle body frame 15 based on a shaft coupler 80 illustrated in FIGS. 5, 11.

As illustrated in FIGS. 5, 11, the shaft coupler 80 includes a pair of right and left coupling frames 81 extending in the vehicle-body front-rear direction. The pivot shaft 28 extends through a pivot shaft holder 82 and fixed thereto. The pivot shaft holder 82 is formed in an intermediate portion of each of the right and left coupling frames 81 in the vehicle-body front-rear direction. In this example embodiment, the pivot shaft 28 is fixed to the pivot shaft holder 82 by welding. Front and rear coupling sections 83 are provided for each of the right and left coupling frames 81. A front holder 84 and a rear holder 85 are provided for a lower portion of the transmission case 19. The front coupling section 83 is coupled to the front holder 84. The rear coupling section 83 is coupled to the rear holder 85. As a result, the right and left coupling frames 81 are each coupled to the transmission case 19. The pivot shaft 28 is coupled to the transmission case 19 of the vehicle body frame 15 via each of the right and left coupling frames 81.

As illustrated in FIG. 11, the shaft coupler 80 includes a pivot shaft change mechanism 86. The pivot shaft change mechanism 86 is configured to change the coupling position of the pivot shaft 28 in the vehicle body frame 15.

As illustrated in FIG. 11, the pivot shaft change mechanism 86 includes a bolt attachment hole 84a, a bolt attachment hole 85a, and a coupling bolt 87. A plurality of bolt attachment holes 84a is provided for the front holder 84 to be arranged in the vehicle-body front-rear direction. A plurality of bolt attachment holes 85a is provided for the rear holder 85 to be arranged the vehicle-body front-rear direction. The coupling bolt 87 detachably couples the front coupling section 83 of each of the right and left coupling frames 81 to the front holder 84. The coupling bolt 87 detachably couples the rear coupling section 83 of each of the right and left coupling frames 81 to the rear holder 85.

In the pivot shaft change mechanism 86, the coupling bolt 87 of the front coupling section 83 is freely attachable to any of the plurality of bolt attachment holes 84a of the front holder 84, and the coupling bolt 87 of the rear coupling section 83 is freely attachable to any of the plurality of bolt attachment holes 85a of the rear holder 85. As a result, the coupling position of the pivot shaft 28 in the vehicle body frame 15 is changeable in the vehicle-body front-rear direction. In this example embodiment, as illustrated in FIGS. 5, 7, a first coupling position P1, a second coupling position P2, and a third coupling position P3 arranged at intervals in the vehicle-body front-rear direction are set as a coupling position to which the pivot shaft 28 is couplable. The coupling position of the pivot shaft 28 is changeable between three positions in the vehicle-body front-rear direction in a stepped manner. The first coupling position P1 is a frontmost coupling position among the three coupling positions. The third coupling position P3 is a rearmost coupling position among the three coupling positions. The second coupling position P2 is a coupling position between the first coupling position P1 and the third coupling position P3.

For example, in a case where a work device is towed or the vehicle body turns, when the pivot shaft 28 is coupled to the third coupling position P3 of the vehicle body frame 15, grounding reaction forces of the intermediate wheel 3 and the rear wheel 2 are applied to a rear side of the vehicle body frame 15 as compared to a case where the pivot shaft 28 is coupled to the first coupling position P1 or the second coupling position P2 in the vehicle body frame 15.

In a case of an uneven ground, for example, when the pivot shaft 28 is coupled to the second coupling position P2 of the vehicle body frame 15, grounding reaction forces of the intermediate wheel 3 and the rear wheel 2 are applied to the rear side of the vehicle body frame 15 as compared to a case where the pivot shaft 28 is coupled to the first coupling position P1 and to a front side of the vehicle body frame 15 as compared to a case where the pivot shaft 28 is coupled to the third coupling position P3.

For example, in a case of a leveled ground, when the pivot shaft 28 is coupled to the first coupling position P1 of the vehicle body frame 15, grounding reaction forces of the intermediate wheel 3 and the rear wheel 2 are applied to the front side of the vehicle body frame 15 as compared to a case where the pivot shaft 28 is coupled to the second coupling position P2 or the third coupling position P3.

In this example embodiment, the plurality of bolt attachment holes 84a of the front holder 84 is arranged in the front-rear direction at the same interval as the interval between two coupling bolts 87 of the front coupling section 83. Similarly, the plurality of bolt attachment holes 85a of the rear holder 85 is arranged in the front-rear direction at the same interval as the interval between two coupling bolts 87 of the rear coupling section 83. Even in a case where any of the first coupling position P1, the second coupling position P2, and the third coupling position P3 is set as the coupling position of the pivot shaft 28, two bolt attachment holes 84a are used from among the plurality of bolt attachment holes 84a of the front holder 84, and two bolt attachment holes 85a are used from among the plurality of bolt attachment holes 85a of the rear holder 85. In a case where the coupling position is changed between the first coupling position P1 and the second coupling position P2, and in a case where the coupling position is changed between the second coupling position P2 and the third coupling position P3, that is, in a case where the coupling position is changed to one position ahead or behind, one of the two bolt attachment holes 84a, 85a is used as a common bolt attachment hole. In this example embodiment, two bolt attachment holes 84a, 85a and two coupling bolts 87 are used, but one bolt attachment hole or three or more bolt attachment holes may be used, and one coupling bolt 87 or three or more coupling bolts 87 may be used.

As illustrated in FIG. 7, three pivot shaft attachment holes 88 are provided on the outer wall portion 25f of the retention frame 25 to be arranged in the front-rear direction. In a case where the coupling position of the pivot shaft 28 in the vehicle body frame 15 is changed, the pivot shaft 28 is attachable to the retention frame 25 with use of a pivot shaft attachment hole 88 corresponding to the coupling position of the pivot shaft 28 in the vehicle body frame 15, from among the three pivot shaft attachment holes 88. As a result, regardless of whether the coupling position of the pivot shaft 28 in the vehicle body frame 15 is changed or not, it is not necessary to change respective positions of the intermediate wheel 3 and the rear wheel 2 in the front-rear direction relative to the vehicle body 4.

Figure 16:
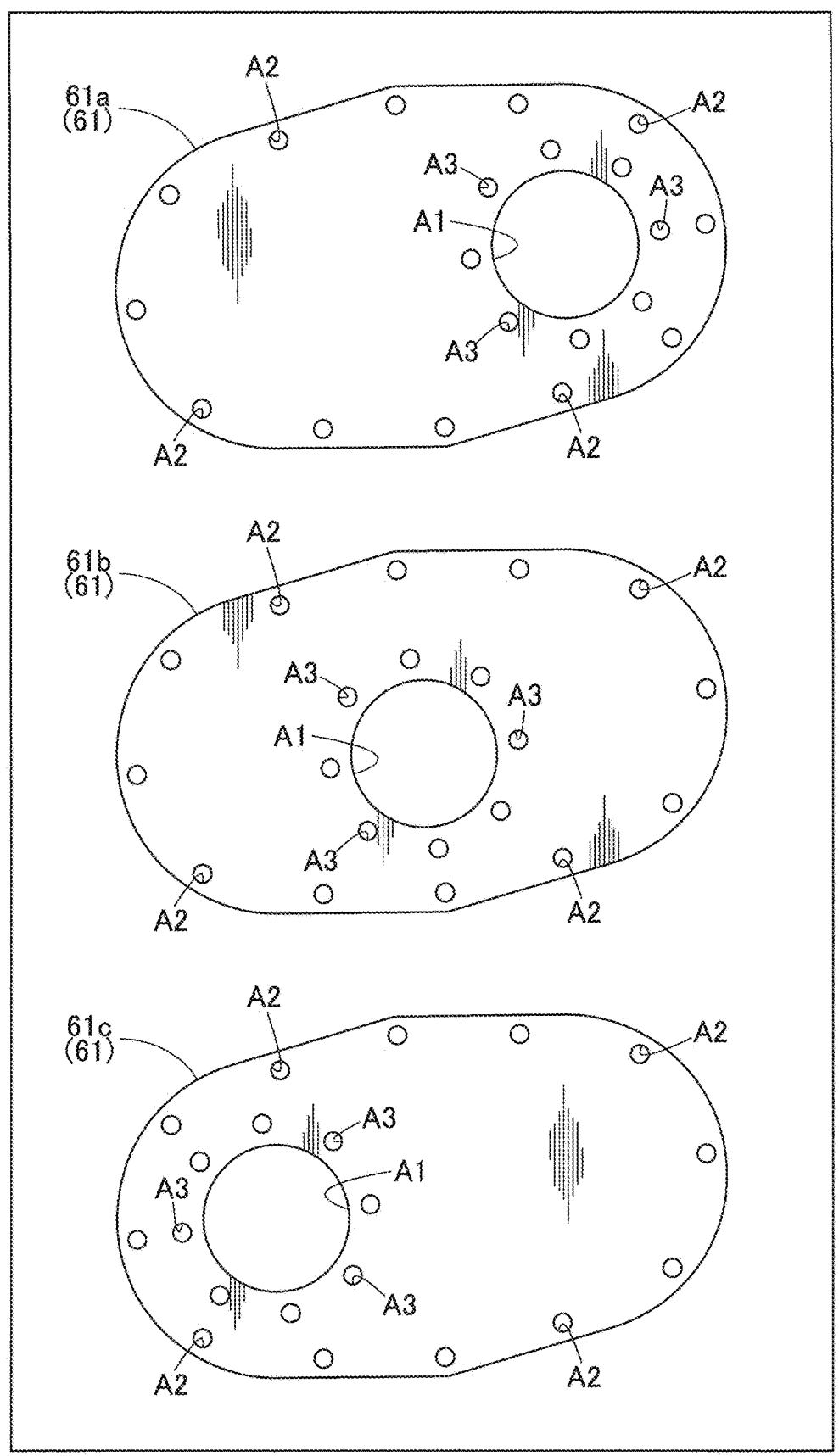
FIG. 16 is a side view of a cover.

That is, in a case where the pivot shaft 28 is coupled at the first coupling position P1, the pivot shaft 28 is attached to the retention frame 25 with a frontmost pivot shaft attachment hole 88 from among the three pivot shaft attachment holes 88. In this case, as illustrated in FIG. 8, the pivot shaft 28 extends through a frontmost pivot shaft insertion hole 89 from among three pivot shaft insertion holes 89 on the inner wall portion 25r of the retention frame 25. In a case where the pivot shaft 28 is attached with use of the frontmost pivot shaft attachment hole 88 as such, a first cover 61a among three covers 61 illustrated in FIG. 16 is attached to a surface of the outer wall portion 25f, so that the other pivot shaft attachment holes 88 to which the pivot shaft 28 is not attached can be blocked by the first cover 61a. As illustrated in FIG. 9, when the output shaft 32 extends through a frontmost output shaft insertion hole 90 from among three output shaft insertion holes 90 on the power transmission case 31 of the upstream transmission 30, the attachment position of the pivot shaft 28 in the retention frame 25 is changeable.

In a case where the pivot shaft 28 is coupled at the second coupling position P2, the pivot shaft 28 is attached to the retention frame 25 with use of an intermediate pivot shaft attachment hole 88 from among the three pivot shaft attachment holes 88. In this case, the pivot shaft 28 extends through an intermediate pivot shaft insertion hole 89 from among the three pivot shaft insertion holes 89. In a case where the pivot shaft 28 is attached with use of the intermediate pivot shaft attachment hole 88 as such, a second cover 61b among the three covers 61 is attached to the surface of the outer wall portion 25f, so that the other pivot shaft attachment holes 88 to which the pivot shaft 28 is not attached can be blocked by the second cover 61b. When the output shaft 32 extends through an intermediate output shaft insertion hole 90 from among the three output shaft insertion holes 90, the attachment position of the pivot shaft 28 in the retention frame 25 is changeable.

In a case where the pivot shaft 28 is coupled at the third coupling position P3, the pivot shaft 28 is attached to the retention frame 25 with use of a rearmost pivot shaft attachment hole 88 from among the three pivot shaft attachment holes 88. In this case, the pivot shaft 28 extends through a rearmost pivot shaft insertion hole 89 from among the three pivot shaft insertion holes 89. In a case where the pivot shaft 28 is attached with use of the rearmost pivot shaft attachment hole 88 as such, a third cover 61c among the three covers 61 is attached to the surface of the outer wall portion 25f, so that the other pivot shaft attachment holes 88 to which the pivot shaft 28 is not attached can be blocked by the third cover 61c. When the output shaft 32 extends through a rearmost output shaft insertion hole 90 from among the three output shaft insertion holes 90, the attachment position of the pivot shaft 28 in the retention frame 25 is changeable.

As illustrated in FIG. 16, each of the three covers 61 has a pivot shaft hole A1, a plurality of first bolt attachment holes A2, and a plurality of bolt attachment holes A3. An end portion of the pivot shaft 28 is inserted into the pivot shaft hole A1. The first bolt attachment hole A2 is structured so that a coupling bolt to couple the cover 61 to the outer wall portion 25f is attached thereto. The bolt attachment hole A3 is structured so that a coupling bolt to couple the annular coupler 62 (see FIG. 10) is attached thereto.

In this example embodiment, the pivot shaft change mechanism 86 configured to change the coupling position of the pivot shaft 28 in the vehicle body frame 15 in a stepped manner between three positions in the vehicle-body front-rear direction, but the present invention is not limited to this. For example, a pivot shaft change mechanism configured to change the coupling position of the pivot shaft 28 in the vehicle-body front-rear direction in a stepped manner between two positions or four or more positions can be used. Alternatively, a pivot shaft change mechanism which includes a guide configured to slidably hold the coupling frame 81 and a fixing mechanism configured to fix the coupling frame 81 at a given position of the guide and which can steplessly change the coupling position of the pivot shaft 28 to a given position in the vehicle-body front-rear direction can be used. A pivot shaft change mechanism that can change the coupling position of the pivot shaft 28 in the vehicle-body up-down direction can be used. Alternatively, a pivot shaft change mechanism that can change the coupling position of the pivot shaft 28 both in the vehicle-body front-rear direction and the vehicle-body up-down direction can be used.

As illustrated in FIGS. 1, 2, the operation section 9 includes the step 12 as the floor provided forward of and below the operation seat 10, and doorways 9a upward of the step 12 and on respective lateral portions of the operation section 9. The intermediate wheel 3 is laterally outward of the step 12. As illustrated in FIGS. 1, 2, 3, a cover 91 on a lateral side of the step 12 is provided inward of the intermediate wheel 3 in the vehicle-body width direction. The cover 91 is attached to an outer surface of a support 92 provided in a standing manner for a lateral end portion of the step 12. The dimension of the cover 91 in a side view of the vehicle body is set to a dimension allowing the cover 91 to cover a lower portion of the doorway 9a from laterally outward of the doorway 9a. Even when soil or the like is splashed by the intermediate wheel 3 toward the operation section 9, the soil or the like hits the cover 91, so that the cover 91 prevents the soil or the like from entering the operation section 9. In this example embodiment, the cover 91 is made of metal.

As illustrated in FIG. 1, the position of an upper end 91t of the cover 91 is higher than the position of an upper end 3t of the intermediate wheel 3. The soil or the like splashed by the intermediate wheel 3 also hits the cover 91 at a position higher than the upper end 3t of the intermediate wheel 3.

As illustrated in FIG. 1, the position of the upper end 91t of the cover 91 is lower than the position of an upper end 2t of the rear wheel 2. The position of the upper end 91t of the cover 91 is higher than the position of an upper end 1t of the front wheel 1.

As illustrated in FIGS. 1, 2, 3, the rear-wheel fender 14 covering the rear wheel 2 is provided laterally outward of the operation section 9. As illustrated in FIGS. 1, 2, the rear-wheel fender 14 is attached to the vehicle body frame 15 by a wall panel 9b extending toward the vehicle body frame 15 from an inner edge portion of the rear-wheel fender 14 in the vehicle-body width direction. The wall panel 9b defines a lateral wall of the operation section 9.

As illustrated in FIGS. 2, 3, the cover 91 has an end portion 91r adjacent to the rear-wheel fender 14 which end portion 91r is at a position facing an end portion (an end portion facing the doorway 9a) of the rear-wheel fender 14 which end portion is adjacent to the intermediate wheel 3. More specifically, the end portion 91r of the cover 91 faces, from the front side, the end portion of the rear-wheel fender 14 which end portion faces the doorway 9a. Even when the soil or the like splashed by the intermediate wheel 3 is directed toward the rear-wheel fender 14 from the cover 91, the soil or the like is less likely to enter the operation section 9 from the end portion 91r of the cover 91.

As illustrated in FIGS. 1, 2, 3, the engine bonnet 7 of the motor section 5 is provided in the front portion of the vehicle body 4 on a side opposite to the rear wheel 2 across the intermediate axle 3a of the intermediate wheel 3. In a side view of the vehicle body, the cover 91 is placed from a position facing an end portion 7t of the engine bonnet 7 which end portion 7t is adjacent to the intermediate wheel 3 to a position facing an end portion of the rear-wheel fender 14 which end portion is adjacent to the intermediate wheel 3. More specifically, an end portion 91f of the cover 91 which end portion 91f is adjacent to the engine bonnet 7 faces, from below, the end portion 7t of the engine bonnet 7 which end portion 7t is adjacent to the intermediate wheel 3. The end portion 91r of the cover 91 which end portion 91r is adjacent to the rear-wheel fender 14 faces the end portion of the rear-wheel fender 14 which end portion is adjacent to the intermediate wheel 3, from the front side (a side opposite to the side where the rear wheel 2 is placed). Even when the soil or the like splashed by the intermediate wheel 3 is directed toward the motor section 5 from the cover 91, the soil or the like is less likely to enter the operation section 9 from the end portion 91*f* of the cover 91. Even when the soil or the like splashed by the intermediate wheel 3 is directed toward the rear-wheel fender 14 from the cover 91, the soil or the like is less likely to enter the operation section 9 from the end portion 91*r* of the cover 91.

Figure 12:
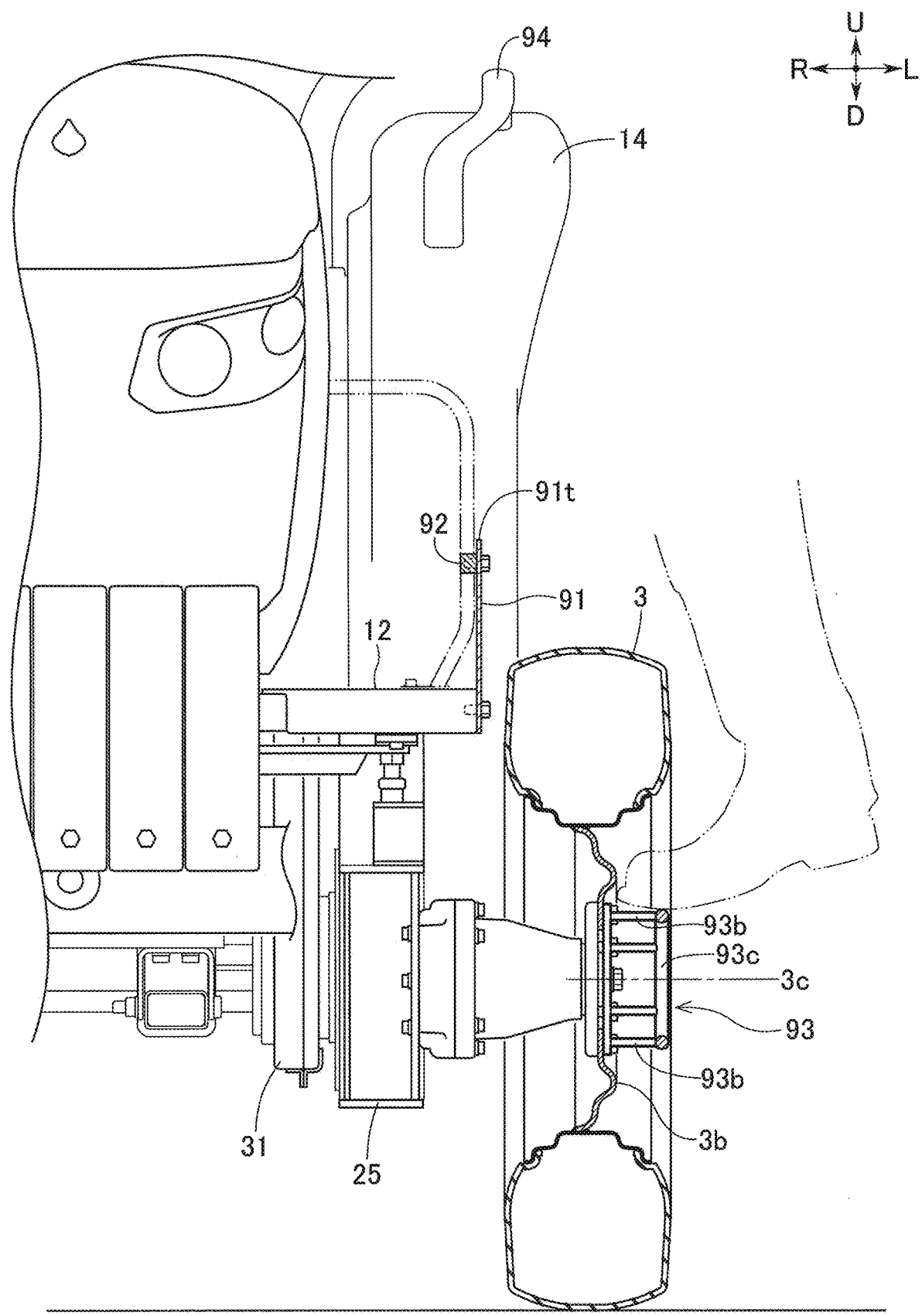
FIG. 12 is a front view of a cover and a footboard.

The footboard 93 is provided for a wheel configured to swing. More specifically, the footboard 93 is provided for the intermediate wheel 3 configured to swing. More specifically, as illustrated in FIGS. 1, 12, the footboard 93 is provided for a portion of a laterally outer portion of the intermediate wheel 3 which portion is closer to an axle center than an outer peripheral edge of the intermediate wheel 3. In this example embodiment, the footboard 93 is attached to a rim 3*b* of the intermediate wheel 3. The footboard 93 includes an attachment seat 93*a* (see FIG. 17), and the attachment seat 93*a* is coupled to the rim 3*b* by tightening. The attachment seat 93*a* is coupled to the rim 3*b* in such a manner that a coupling bolt attached to an attachment hole 93*d* formed in the attachment seat 93*a* is engaged with the rim 3*b*. An operator can get in the operation section 9 with use of the footboard 93 and can get off the operation section 9 with use of the footboard 93.

That is, in a case where the operator gets in the operation section 9, the operator puts one foot on the footboard 93, as illustrated in FIG. 12. The operator uses the footboard 93 as a step to step on the intermediate wheel 3 and climbs over the cover 91 by putting the foot on the cover 91 from the intermediate wheel 3, so that the operator can get on the step 12 of the operation section 9. In a case where the operator gets off the operation section 9, the operator puts one foot on the cover 91 from the step 12 of the operation section 9 and steps on the intermediate wheel 3. Then, the operator puts one foot on the footboard 93 from the intermediate wheel 3 and stands down on the ground from the footboard 93. With use of the footboard 93 as such, the operator can easily step on the intermediate wheel 3 and easily get in the operation section 9 in comparison with a case where the operator directly steps on the intermediate wheel 3 from the ground. The operator also easily gets down on the ground and easily gets off the operation section 9 in comparison with a case where the operator directly gets down on the ground from the intermediate wheel 3. The position of the upper end 91*t* of the cover 91 is lower than the position of the upper end 2*t* of the rear wheel 2. This allows the operator to easily step on the cover 91 from the intermediate wheel 3. It is preferable for the operator to use the footboard 93 when all the six wheels are grounded (when the intermediate wheel 3 provided with the footboard 93 is grounded).

As illustrated in FIGS. 1, 2, 12, the rear-wheel fender 14 is provided with a handrail 94. At the time when the operator gets in and off the operation section 9, the operator grips the handrail 94 by one hand and grips the steering wheel 11 by the other hand, so that the operator can stabilize his or her body.

Figure 17:
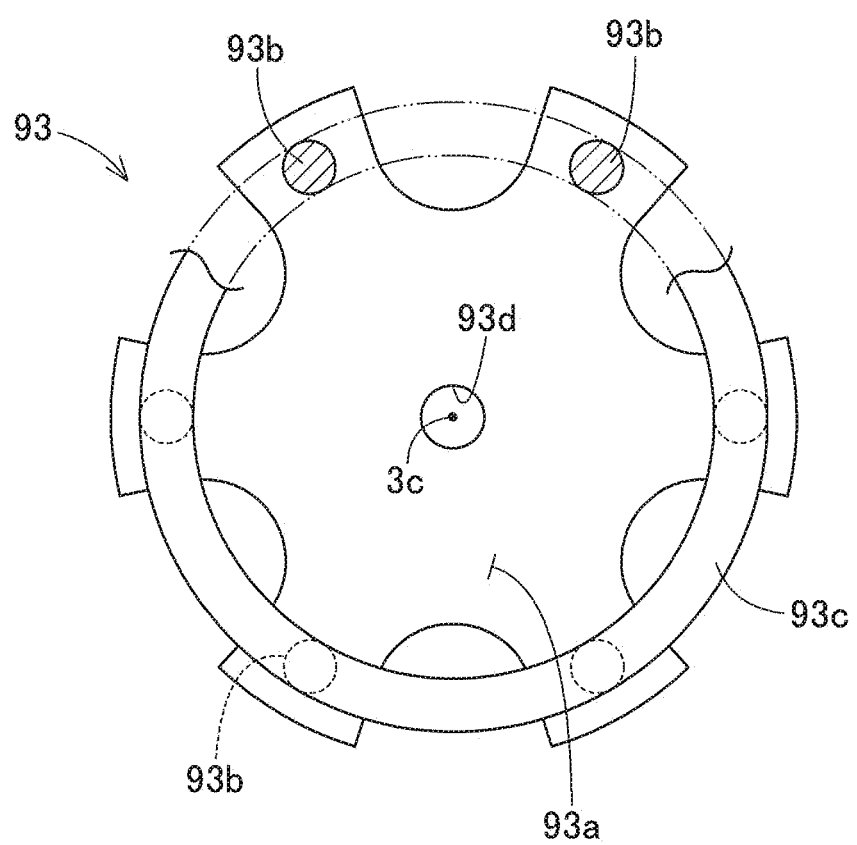
FIG. 17 is a side view of the footboard.

As illustrated in FIGS. 1, 12, 17, the footboard 93 has a circular shape as viewed in a direction along the axle center 3*c* of the intermediate wheel 3. Even in a case where the intermediate wheel 3 stops at any rotation position, the operator can easily put the foot on the footboard 93 due to the circular shape of the footboard 93.

As illustrated in FIGS. 12, 17, the footboard 93 includes a plurality of bar-shaped bodies 93*b* extending in a direction along the axle center 3*c* of the intermediate wheel 3 such that the plurality f bar-shaped bodies 93*b* is arranged along the circumferential direction of the footboard 93. The plurality of bar-shaped bodies 93*b* is arranged in the circumferential direction of the footboard 93 such that adjacent bar-shaped bodies 93*b* are disposed at an interval. Respective end portions of the plurality of bar-shaped bodies 93*b* which respective end portions are opposite to the intermediate wheel are coupled to each other by an annular coupler 93*c*. Water, soil, or the like attached to the footboard 93 easily drops between the bar-shaped bodies 93*b*. As illustrated in FIG. 12, the coupler 93*c* is configured not to project outward of an overall width of the tire. More specifically, in a wheel width direction, the position of a tire outer end of the coupler 93*c* and the position of an outer end of the tire are the same. However, a tire outer end of the rim 3*b* is inward of the outer end of the tire. As a result, the length of the footboard 93 in a direction along the axle center 3*c* of the intermediate wheel 3 is relatively long, so that the operator easily puts the foot on the footboard 93.

As illustrated in FIGS. 1 and 2, the engine bonnet 7 of the motor section 5 is provided for the front portion of the vehicle body 4 on a side opposite to the rear wheel 2 across the intermediate axle 3*a* of the intermediate wheel 3. The fuel tank 8 for the engine is provided laterally outward of the engine bonnet 7. In this example embodiment, the fuel tank 8 is provided laterally outward of the right side of the engine bonnet 7. The fuel tank 8 is provided in a portion placed at a position higher than the upper end 91*t* of the cover 91. The fuel tank 8 is put on a mounting table 95 and fixed to the mounting table 95 by a lashing band. The mounting table 95 is supported by front and rear support columns 97 provided in a standing manner from the support frame 96 of the engine bonnet 7. As illustrated in FIG. 2, the fuel tank 8 and the retention frame 25 do not overlap with each other in a plan view. As illustrated in FIG. 1, the fuel tank 8 is at a position higher than the upper end 1*t* of the front wheel 1 and higher than the upper end 3*t* of the intermediate wheel 3. The fuel tank 8 and the intermediate wheel 3 overlap with each other in a plan view. The fuel tank 8 and the footboard 93 provided for the intermediate wheel 3 are placed close to each other. When the operator puts the foot on the footboard 93, the operator easily refuels the fuel tank 8.

The fuel tank 8 is at a position higher than the upper end 91*t* of the cover 91, in a portion opposite to the rear wheel 2 across the intermediate axle 3*a*. Accordingly, soil or the like splashed by the intermediate wheel 3 is less likely to be applied to the fuel tank 8.

A fuel tank formed integrally with the cover 91 made of resin or a fuel tank formed integrally with the rear-wheel fender 14 made of resin can be used instead of the fuel tank 8.

The present invention is not limited to the configurations of the above example embodiments, and the following describes alternative example embodiments of the present invention.

Figure 18:
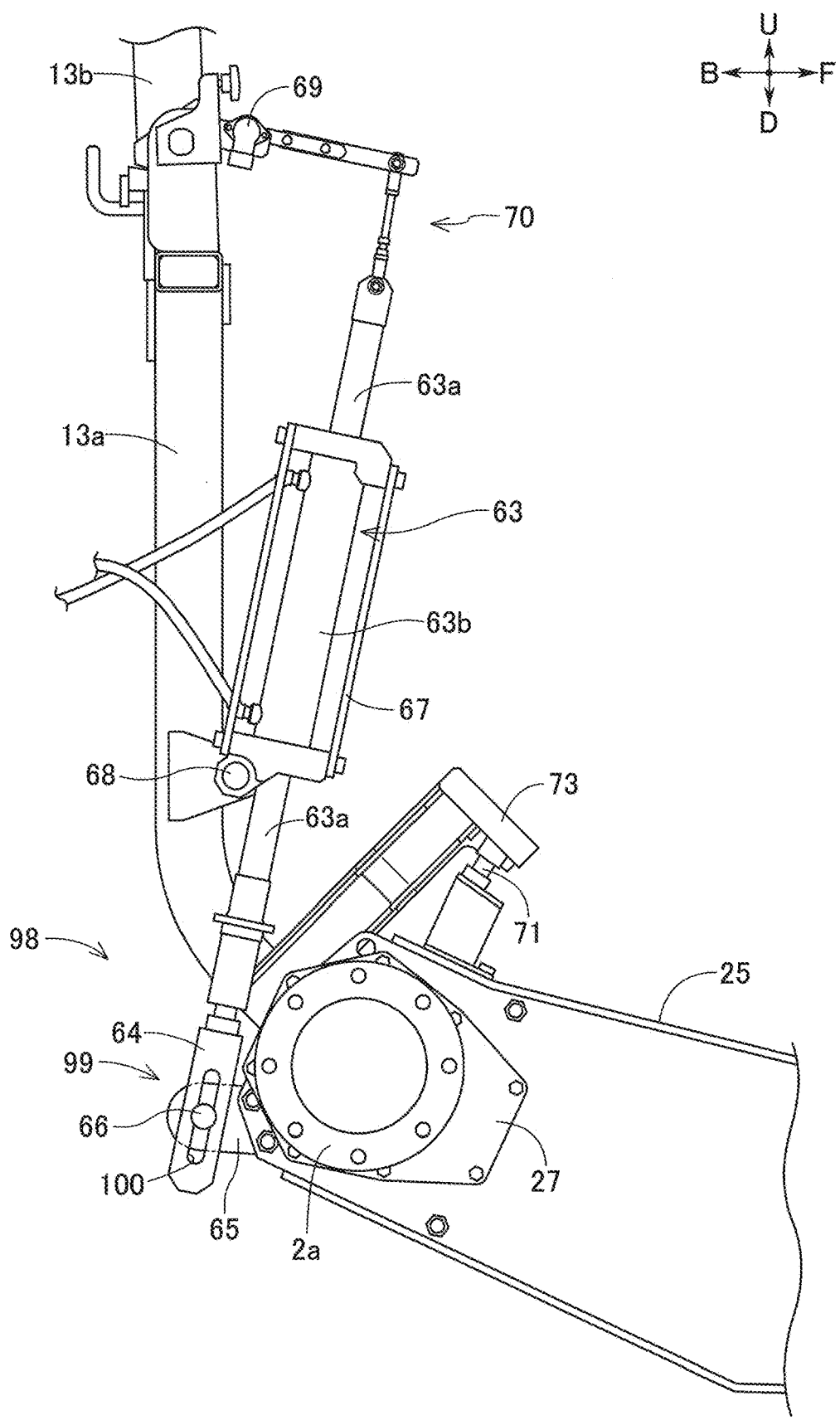
FIG. 18 is a side view of a coupling mechanism for a hydraulic cylinder and a retention frame in an alternative example embodiment of the present invention.

(1) FIG. 18 is a side view illustrating an alternative example embodiment of a linkage mechanism 98 configured to operate the hydraulic cylinder 63 and the retention frame 25 in conjunction with each other. The linkage mechanism 98 of the alternative example embodiment includes a linkage flexible section 99, and the linkage flexible section 99 allows the retention frame 25 to vertically swing within a predetermined range while the hydraulic cylinder 63 is stopped.

More specifically, as illustrated in FIG. 18, the linkage flexible section 99 has an elongated pin hole 100 for the forked coupler 64 of the piston rod 63a, and the coupling pin 66 is slidably inserted and locked in the pin hole 100.

When the coupling pin 66 slides relative to the coupler 64 along the pin hole 100, the linkage flexible section 99 allows the retention frame 25 to vertically swing with the hydraulic cylinder 63 being stopped. A slide stroke by which the coupling pin 66 is slidable is determined by the length of the pin hole 100, and this slide stroke determines a predetermined range where the retention frame 25 is allowed to swing vertically. For example, at the time when the rear wheel 2 passes irregularities on a travel ground, the rear wheel 2 is lifted and lowered due to the irregularities within the predetermined range where the retention frame 25 is allowed to swing vertically. Accordingly, the traveling vibration of the vehicle body due to the irregularities is relieved by lifting and lowering of the rear wheel 2.

Figure 19:
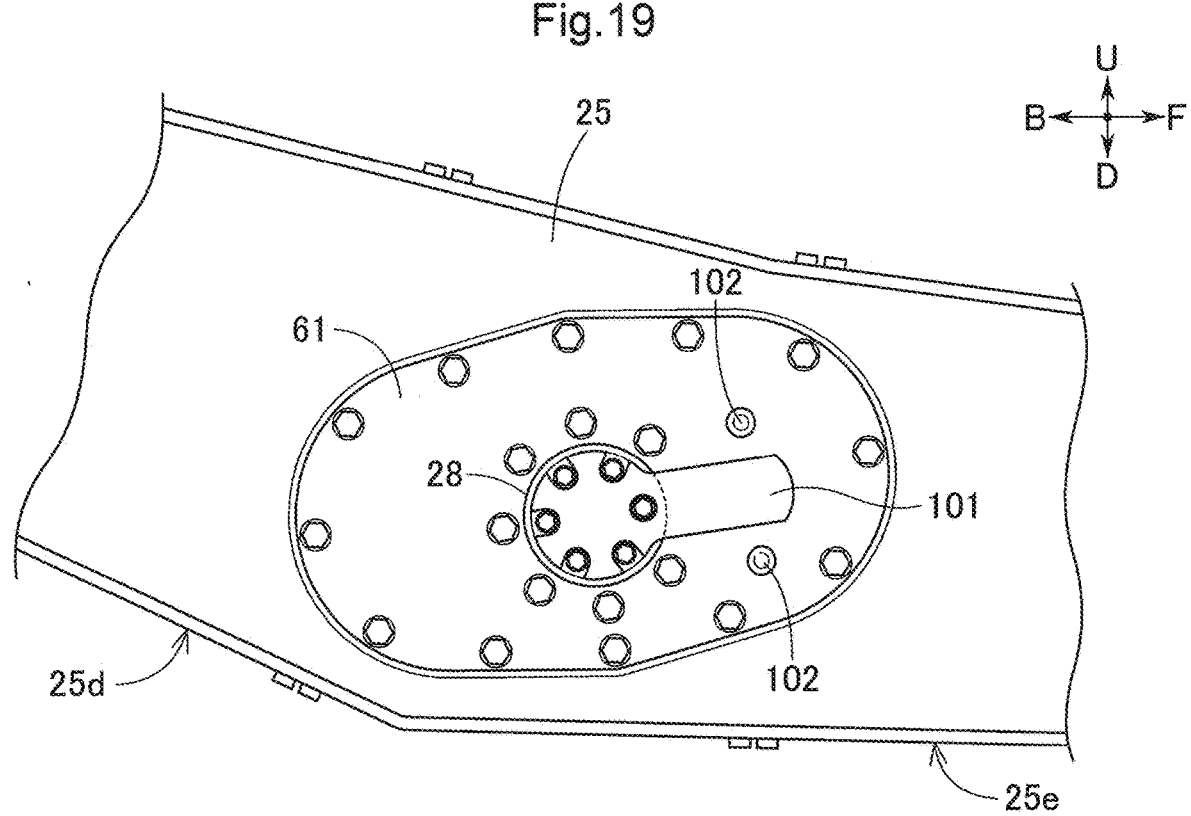
FIG. 19 is a side view of a retention frame swing range determination structure in an alternative example embodiment of the present invention.

(2) FIG. 19 is a side view illustrating an alternative example embodiment of a swing range determination structure to determine the swing range of the retention frame 25. The swing range determination structure of the alternative example embodiment includes a stopper 101 fixed to an end portion of the pivot shaft 28 by coupling bolts and fixed to the vehicle body frame 15 via the pivot shaft 28, and two upper and lower positioning protrusions 102 provided for the cover 61. A swing range where the retention frame 25 is swingable is determined by the stopper 101 and the two upper and lower positioning protrusions 102.

That is, with the swing range determination structure of the alternative example embodiment, when the wheel adjacent portion 25d of the retention frame 25 is lowered, the lower positioning protrusion 102 out of the two positioning protrusions 102 hits the stopper 101, so that the lowering limit of the wheel adjacent portion 25d and the lifting limit of the intermediate-wheel adjacent portion 25e are determined. When the intermediate-wheel adjacent portion 25e of the retention frame 25 is lowered, the upper positioning protrusion 102 hits the stopper 101, so that the lowering limit of the intermediate-wheel adjacent portion 25e and the lifting limit of the wheel adjacent portion 25d are determined.

Figure 20:
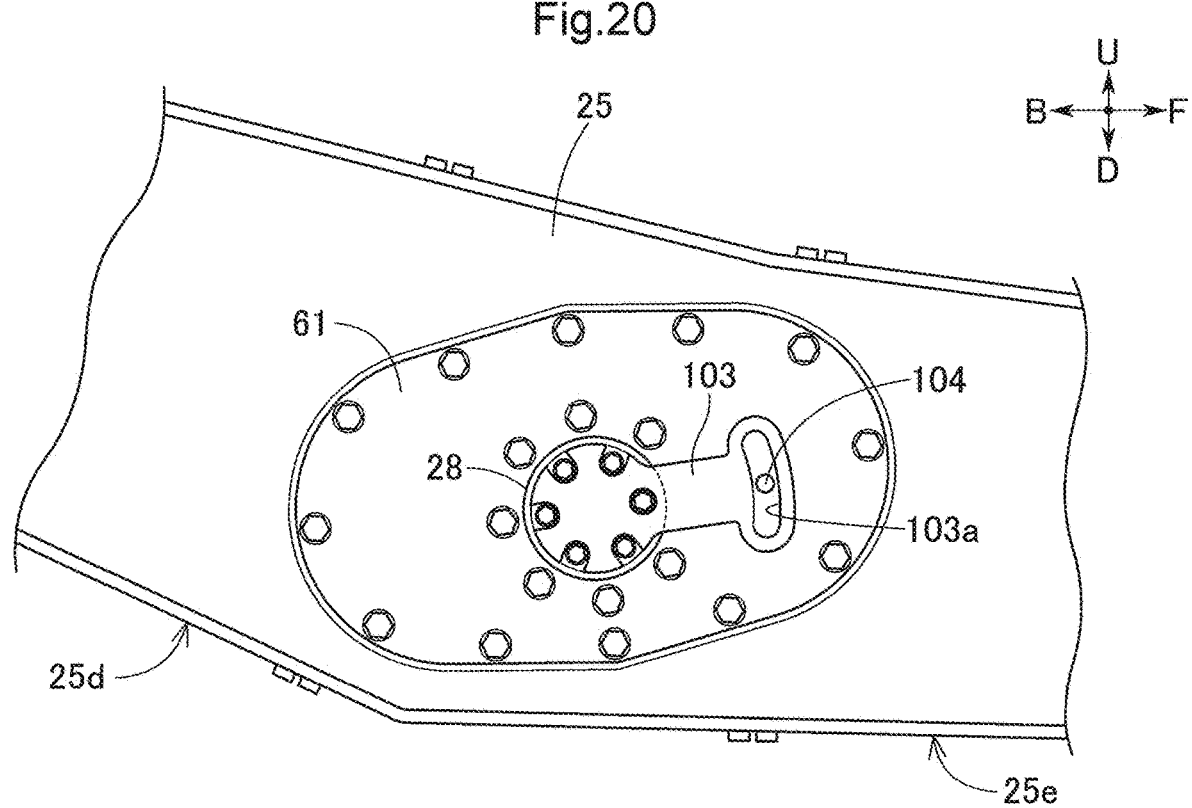
FIG. 20 is a side view of a retention frame swing range determination structure in another alternative example embodiment of the present invention.

(3) FIG. 20 is a side view illustrating another alternative example embodiment of the swing range determination structure to determine the swing range of the retention frame 25. The swing range determination structure of another alternative example embodiment includes a stopper 103 fixed to the end portion of the pivot shaft 28 by coupling bolts and fixed to the vehicle body frame 15 via the pivot shaft 28, and a single positioning protrusion 104 provided for the cover 61. The stopper 103 has an elongated hole 103a having an arcuate shape, and the positioning protrusion 104 is inserted and locked in the elongated hole 103a. A swing range where the retention frame 25 is swingable is determined by the stopper 103 and the positioning protrusion 104.

That is, in the swing range determination structure of the another alternative example embodiment, when the wheel adjacent portion 25d of the retention frame 25 is lowered, the positioning protrusion 104 is lifted inside the elongated hole 103a and hits the stopper 103 at an upper end portion of the elongated hole 103a, so that the lowering limit of the wheel adjacent portion 25d and the lifting limit of the intermediate-wheel adjacent portion 25e are determined. When the intermediate-wheel adjacent portion 25e of the retention frame 25 is lowered, the positioning protrusion 104 is lowered inside the elongated hole 103a and hits the stopper 103 at a lower end portion of the elongated hole 103a, so that the lowering limit of the intermediate-wheel adjacent portion 25e and the lifting limit of the wheel adjacent portion 25d are determined.

Figure 21:
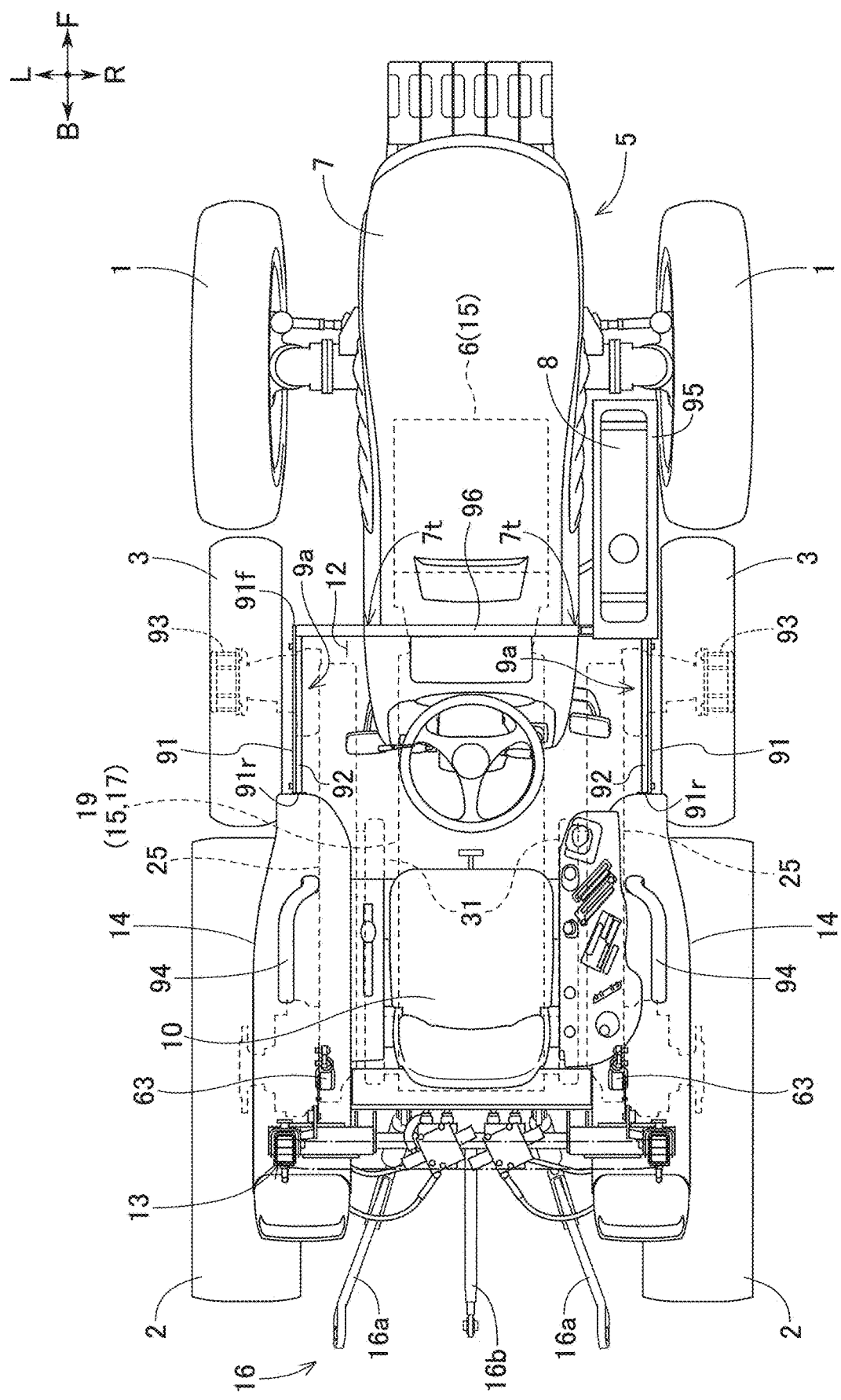
FIG. 21 is a plane view illustrating a fuel tank installation structure in an alternative example embodiment of the present invention.

(4) FIG. 21 is a plane view illustrating a fuel tank installation structure of an alternative example embodiment. In the fuel tank installation structure of the alternative example embodiment, the fuel tank 8 is provided laterally outward of the right side of the engine bonnet 7, at a position higher than the upper end 91t of the cover 91, and is also provided inward of the cover 91 in the vehicle-body width direction.

Figure 22:
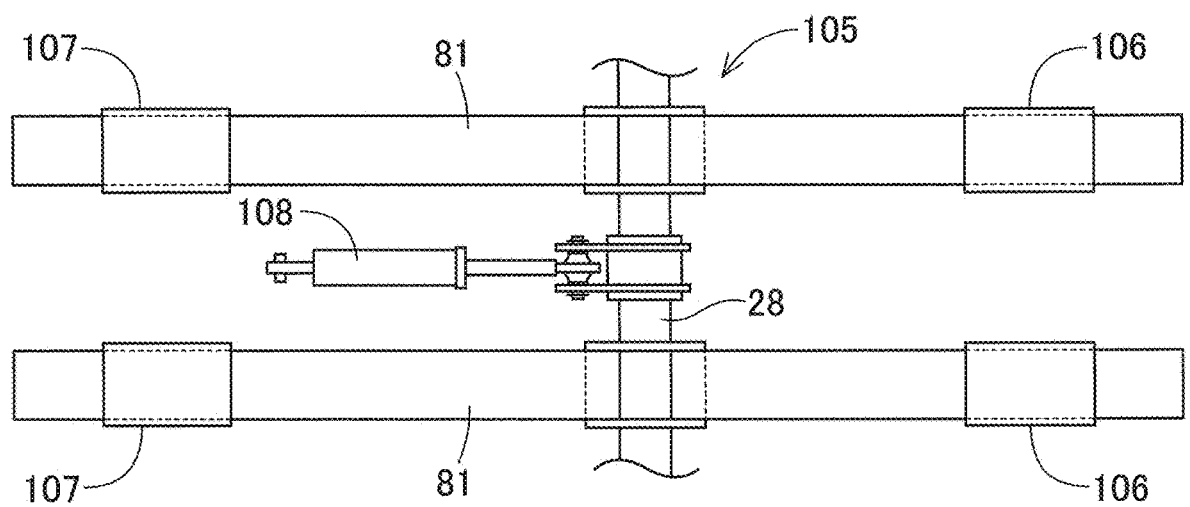
FIG. 22 is a plane view of a pivot shaft change mechanism in an alternative example embodiment of the present invention.

(5) FIG. 22 is a plane view of a pivot shaft change mechanism 105 of an alternative example embodiment.

The pivot shaft change mechanism 105 of the alternative example embodiment includes front guide bodies 106 provided forward of the pivot shaft 28 in the vehicle-body front-rear direction and configured to slidably hold the right and left coupling frames 81, respectively, rear guide bodies 107 provided rearward of the pivot shaft 28 in the vehicle-body front-rear direction and configured to slidably hold the right and left coupling frames 81, respectively, and a position change cylinder 108 coupled to a central portion of the pivot shaft 28 in the vehicle-body width direction. The right and left front guide bodies 106 and the right and left rear guide bodies 107 are fixed to the lower portion of the vehicle body frame 15. In this example embodiment, the position change cylinder 108 is a hydraulic cylinder.

In the pivot shaft change mechanism 105 of the alternative example embodiment, the pivot shaft 28 is guided by the front guide bodies 106 and the rear guide bodies 107 in response to expansion and contraction of the position change cylinder 108 as an actuator and is moved in the vehicle-body front-rear direction. The coupling position of the pivot shaft 28 in the vehicle body frame 15 is steplessly changed to a given position in the vehicle-body front-rear direction by the position change cylinder 108.

Figure 23:
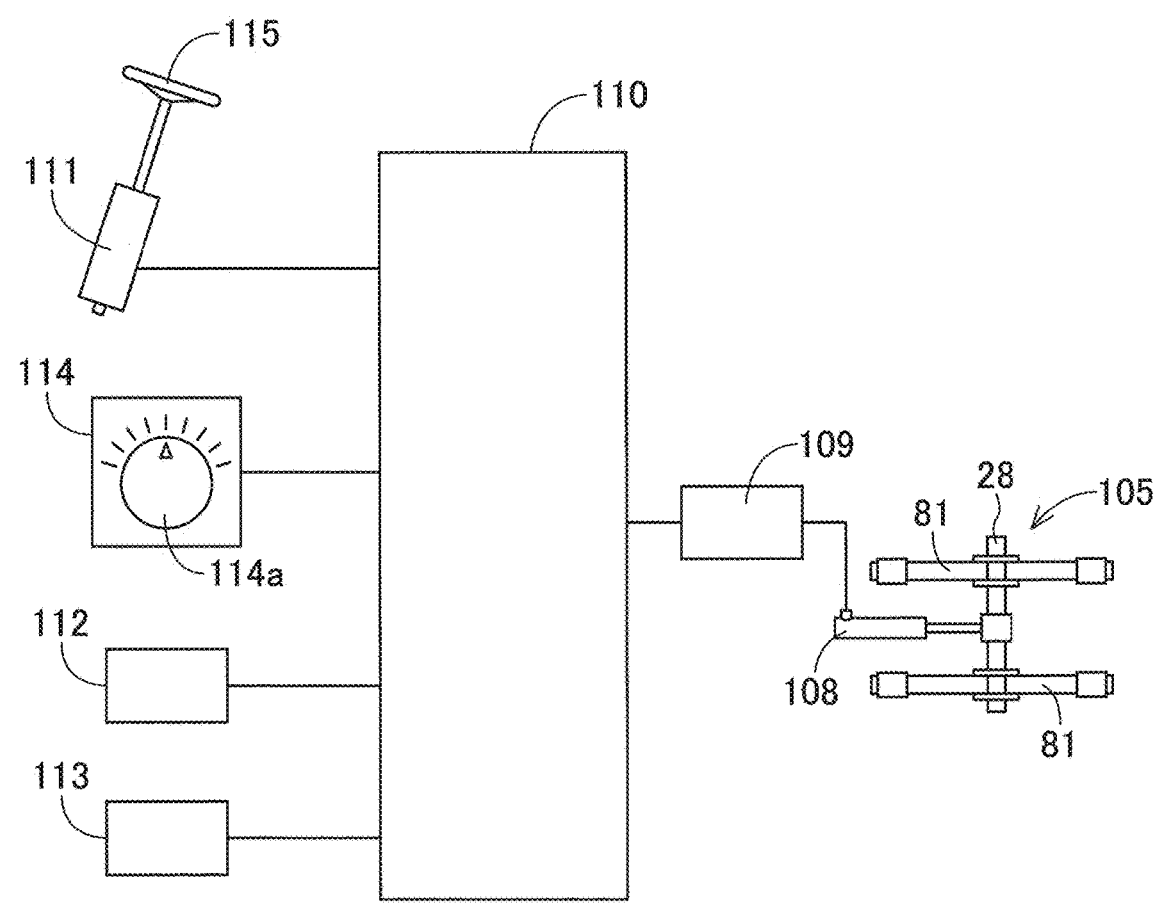
FIG. 23 is a block diagram of a pivot shaft change control.

As illustrated in FIG. 23, the position change cylinder 108 includes an operating valve 109 linked to a controller 110. The controller 110 is linked to a first detector 111, a second detector 112, a third detector 113, and a manipulator 114. The controller 110 includes a microcomputer.

The manipulator 114 includes an artificially operable operating section 114a and is configured to specify, by the operation of the operating section 114a, a coupling position where the pivot shaft 28 should be placed. The controller 110 is configured or programmed to control the operating valve 109 in response to the specification by the manipulator 114 to expand and contract the position change cylinder 108 and causes the position change cylinder 108 to change the coupling position of the pivot shaft 28 in the vehicle body frame 15 to the specified coupling position. The coupling position of the pivot shaft 28 in the vehicle body frame 15 can be adjusted to a desired coupling position by the manipulator 114.

The operating section 114a of the manipulator 114 of this example embodiment is a dial and specifies the coupling position of the pivot shaft 28 by rotating the dial. The manipulator 114 may be operated by a touch panel, other than the configuration to be operated by the dial.

The first detector 111 is configured to detect the operation of a steering operation tool 115 configured to steer the vehicle body 4. The controller 110 is configured or programmed to control the operating valve 109 based on a detection result from the first detector 111 so as to expand and contract the position change cylinder 108 and cause the position change cylinder 108 to change the coupling position of the pivot shaft 28 in the vehicle body frame 15 to a coupling position corresponding to the detection result from the first detector 111. For example, in a case where the front wheel 1 is steered from straight traveling to the left or the right by a predetermined angle or more, the coupling position of the pivot shaft 28 is changed such that the coupling position of the pivot shaft 28 in this case is placed rearward of the coupling position of the pivot shaft 28 when the front wheel 1 is steered straight or steered by less than the predetermined angle.

In this example embodiment, the steering operation tool 115 is the steering wheel 11, and the first detector 111 is a rotary potentiometer working in conjunction with the steering wheel 11. Instead of the steering wheel 11, a steering lever or the like can be used as the steering operation tool 115. Instead of the rotary potentiometer, a detection switch can be used as the first detector 111.

The second detector 112 is configured to detect a travel surface state forward of the vehicle body 4. The controller 110 is configured or programmed to control the operating valve 109 based on a detection result from the second detector 112 so as to expand and contract the position change cylinder 108 and causes the position change cylinder 108 to change the coupling position of the pivot shaft 28 in the vehicle body frame 15 to a coupling position corresponding to the detection result from the second detector 112. For example, in a case where the travel surface has large irregularities, the coupling position of the pivot shaft 28 is changed such that the coupling position of the pivot shaft 28 in this case is rearward of the coupling position of the pivot shaft 28 when the irregularities of the travel surface are not so large.

In this example embodiment, the second detector 112 is a camera. Instead of the camera, a ground sensor can be used as the second detector 112. A detector configured to detect a travel surface state detected in previous traveling and stored in the controller 110, as a travel surface state at the time of current traveling, based on the travel surface state thus stored and positional information on the vehicle body 4 may be used as the second detector 112.

The third detector 113 is configured to detect work contents. The controller 110 is configured or programmed to control the operating valve 109 based on a detection result from the third detector 113 so as to expand and contract the position change cylinder 108 and causes the position change cylinder 108 to change the coupling position of the pivot shaft 28 in the vehicle body frame 15 to a coupling position corresponding to the detection result from the third detector 113. For example, in a case of work contents that require a large traction load, the coupling position of the pivot shaft 28 is changed such that the coupling position of the pivot shaft 28 in this case is placed rearward of the coupling position of the pivot shaft 28 when the traction load is not so large.

In this example embodiment, the third detector 113 detects work contents by detecting a detected portion in a work device coupled to the coupler 16 by contact or the like so as to detect a type of the work device, e.g., a rotary cultivating device, a roll bailer, a chemical agent applicator, or the like.

(6) In the above example embodiment, the drive source is the engine 6, but the drive source is not limited to the engine 6 and may be an electric motor or may include both an engine and an electric motor.

(7) In the above example embodiment, the intermediate wheel 3 is provided, but the intermediate wheel 3 may not be provided. That is, the rear wheel 2 is placed laterally outward of the step 12, and the travel device includes the front wheel 1 and the rear wheel 2 without the intermediate wheel 3.

(8) In the above example embodiment, only one intermediate wheel 3 is provided, but two or more intermediate wheels 3 may be provided.

(9) The above example embodiment deals with an example in which the front wheel 1 and the rear wheel 2 are both driving wheels, and the outside diameter of the intermediate wheel 3 is smaller than the outside diameters of the front wheel 1 and the rear wheel 2. However, the present invention is not limited to this. Either the front wheel 1 or the rear wheel 2 may be a driving wheel. In a case where either the front wheel 1 or the rear wheel 2 is a driving wheel, the outside diameter of the intermediate wheel 3 should be smaller than the outside diameter of the driving wheel out of the front wheel 1 and the rear wheel 2.

(10) The above example embodiment deals with an example in which the intermediate wheel 3 and the rear wheel 2 (the driving wheel) are held by the retention frame 25 and supported by the vehicle body frame 15 via the retention frame 25. However, the retention frame 25 may not be provided, and the intermediate wheel 3 and the rear wheel 2 may be directly supported by the vehicle body frame 15. Alternatively, the intermediate wheel 3 may be held by the retention frame 25, but the rear wheel 2 (the driving wheel) may not be held by the retention frame 25. In the configuration in which the intermediate wheel 3 is held by the retention frame 25 but the rear wheel 2 (the driving wheel) is not held by the retention frame 25, the pivot shaft 28 may be provided for an intermediate portion between the intermediate wheel holder 25*a* of the retention frame 25 and a wheel holder placed in a portion other than the retention frame 25. The pivot shaft 28 is provided for the retention frame 25.

(11) The above example embodiment deals with an example in which the vehicle body frame 15 supports the intermediate portion 25*c* of the retention frame 25, but the vehicle body frame 15 may support any portion of the retention frame 25 in such a manner that the retention frame 25 is swingable.

(12) The above example embodiment deals with an example in which the pivot shaft axis Y is between the wheel holder 25*b* and the intermediate wheel holder 25*a*, but the pivot shaft axis Y may be placed in any portion of the retention frame 25.

(13) The above example embodiment deals with an example in which the retention frame 25 is swingably supported by the vehicle body frame 15 with the pivot shaft axis Y being as a swing pivot, but the retention frame 25 may be supported in such a manner as not to be swingable relative to the vehicle body frame 15.

(14) The above example embodiment deals with an example in which the pivot shaft 28 is provided, but a structure to swingably couple the retention frame 25 to the vehicle body frame 15 may be any coupling structure such as a link mechanism, other than the pivot shaft.

(15) The above example embodiment deals with an example in which the pivot shaft 28 is provided for the intermediate portion 25*c*, but the pivot shaft 28 may be provided for any portion of the retention frame 25.

(16) In the above example embodiment, the hydraulic cylinder 63 as an actuator to swing the retention frame 25 is provided, but no actuator may be provided.

(17) In the above example embodiment, a hydraulic cylinder is used as the actuator to swing the retention frame 25, but an electric motor, a hydraulic motor, or the like is also useable instead of the hydraulic cylinder.

(18) In the above example embodiment, the accumulator 78 is provided, but no accumulator may be provided.

(19) The above example embodiment deals with an example in which the retention frame 25 extends in the front-rear direction below the rear-wheel fender 14 while the retention frame 25 overlaps with the rear-wheel fender 14 in a plan view. However, the retention frame 25 may be provided in any arrangement.

(20) The above example embodiment deals with an example in which the retention frame 25 passes through a space between the rear wheel 2 and the transmission case 19 in the front-rear direction. However, the retention frame 25 may be provided in any arrangement.

(21) The above example embodiment deals with an example in which the rear axle 2a is laterally outward of the retention frame 25 in the vehicle-body width direction, but the present invention is not limited to this. The rear axle 2a may be at any position relative to the retention frame 25, e.g., the rear axle 2a may be laterally inward of the retention frame 25 in the vehicle-body width direction.

(22) The above example embodiment deals with an example in which the center C1 of the retention frame 25 is rearward of the center C2 of the vehicle body frame 15, but the present invention is not limited to this. The center C1 of the retention frame 25 may be at the same position as the center C2 in the vehicle-body front-rear direction or may be forward of the center C2.

(23) The above example embodiment deals with an example in which the intermediate-wheel power transmission 41 and the wheel power transmission 51 are provided for the retention frame 25, but the intermediate-wheel power transmission 41 and the wheel power transmission 51 may not be provided for the retention frame 25.

(24) The above example embodiment deals with an example in which the intermediate-wheel power transmission and the wheel power transmission are provided inside the retention frame 25, but the present invention is not limited to this. The intermediate-wheel power transmission and the wheel power transmission may be provided outside the retention frame.

(25) The above example embodiment deals with an example in which the input section 34 is provided. However, the input section 34 may not be provided, and a driving force from the transmission 17 may be transmitted individually to the intermediate-wheel power transmission 41 and the wheel power transmission 51.

(26) The above example embodiment deals with an example in which the intermediate-wheel power transmission 41 and the wheel power transmission 51 each include an endless roller chain, but the present invention is not limited to this. The intermediate-wheel power transmission 41 and the wheel power transmission 51 may each include a rotation transmission shaft.

(27) The above example embodiment deals with an example in which the first transmission wheel body 42 and the second transmission wheel body 52 on the pivot shaft side, the transmission wheel bodies 44, 54 on the wheel side, and the endless roller transmission bodies 45, 55 are provided, but they may not be provided.

(28) The above example embodiment deals with an example in which the tension operating structures 49, 59, and the biasing mechanisms 49a, 59a are provided, but they may not be provided.

(29) The above example embodiment deals with an example in which the power transmission 33 that can be braked, but the power transmission 33 may not be provided.

(30) The above example embodiment deals with an example in which the intermediate-wheel gear transmission section 46 and the wheel gear transmission section 56 are provided, but the intermediate-wheel gear transmission section 46 and the wheel gear transmission section 56 may not be provided. In a case where the intermediate-wheel gear transmission section 46 and the wheel gear transmission section 56 are provided, the intermediate-wheel gear transmission section 46 and the wheel gear transmission section 56 may be configured to output power without changing the rotation direction of power from the input section 34 to its reverse direction.

(31) The above example embodiment deals with an example in which the rear wheel 2 is held by the wheel holder 25b, but the front wheel 1 may be held by the wheel holder 25b, instead of the rear wheel 2.

(32) The above example embodiment deals with an example in which the position of the wheel adjacent portion 25d is higher than the position of the intermediate-wheel adjacent portion 25e such that the wheel adjacent portion 25d is inclined, but the retention frame 25 may have any shape.

(33) The above example embodiment deals with an example in which the position of the upper end 91t of the cover 91 is higher than the position of the upper end 3t of the intermediate wheel 3, but the present invention is not limited to this. The position of the upper end 91t of the cover 91 may be the same as the position of the upper end 3t of the intermediate wheel 3 in the up-down direction. Alternatively, the position of the upper end 91t of the cover 91 may be lower than the position of the upper end 3t of the intermediate wheel 3.

(34) The above example embodiment deals with an example in which the position of the upper end 91t of the cover 91 is lower than the position of the upper end 2t of the rear wheel 2, but the present invention is not limited to this. The position of the upper end 91t of the cover 91 may be the same as the position of the upper end 2t of the rear wheel 2 in the up-down direction. Alternatively, the position of the upper end 91t of the cover 91 may be higher than the position of the upper end 2t of the rear wheel 2, depending on the dimension of the outside diameter of the rear wheel 2.

(35) The above example embodiment deals with an example in which the end portion 91r of the cover 91 is at a position facing the rear-wheel fender 14, but the end portion 91r of the cover 91 may not face the rear-wheel fender 14.

(36) The above example embodiment deals with an example in which the cover 91 extends from the position facing the end portion 7t of the engine bonnet 7 to the position facing the end portion of the rear-wheel fender 14, but this configuration may not be provided.

(37) The above example embodiment deals with an example in which the footboard 93 is provided, but the footboard 93 may not be provided.

(38) The above example embodiment deals with an example in which the footboard 93 has a circular shape, but the footboard 93 may not have a circular shape. For example, the footboard 93 may have any shape such as a bar shape extending outward from an axle center.

(39) The above example embodiment deals with an example in which the bar-shaped bodies 93*b* are arranged at intervals in the circumferential direction of the footboard 93, but no bar-shaped bodies may be provided. That is, the footboard 93 may have a circular shape with no hole being provided in the circumference of the footboard 93.

(40) The above example embodiment deals with an example in which the fuel tank 8 is provided laterally outward of the right side of the engine bonnet 7, but the fuel tank 8 may be provided laterally outward of the left side of the engine bonnet 7. The fuel tank 8 is provided on each lateral side of the engine bonnet 7.

(41) The above example embodiment deals with an example in which an actuator configured to change the position of the pivot shaft 28 is provided, but no actuator may be provided.

(42) The above example embodiment deals with an example in which the position change cylinder 108 is used as the actuator, but the present invention is not limited to this. An electric motor, a hydraulic motor, or the like may be used.

(43) The above example embodiment deals with an example in which the first detector 111, the second detector 112, the third detector 113, and the manipulator 114 are provided, but only any one of them, any two of them, or any three of them may be provided.

(44) In the above example embodiment, the steering wheel 11 is used as a steering operation tool, but various operation tools having different forms such as a steering lever can be used.

(45) The above example embodiment deals with an example in which the coupler is provided, but no coupler may be provided.

The configurations described in the above example embodiments (including the alternative example embodiments, the same applies hereinafter) can be applied in combination with configurations of other example embodiments as long as no inconsistency occurs. Further, the example embodiments disclosed in the present specification are just examples. The example embodiments of the present invention are not limited to this, and various modifications can be made within a range that does not deviate from the scope of the present invention.

Example embodiments of the present invention are not limited to tractors and are applicable to various work machines and agricultural machines such as rice transplanters and chemical agents.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work machine, comprising:
   a front wheel;
   a rear wheel;
   an intermediate wheel between the front wheel and the rear wheel; and
   a transmission to receive a driving force from a drive source and transmit the driving force to the intermediate wheel and at least one of the front wheel or the rear wheel that is drivable as a driving wheel; wherein
   the intermediate wheel has an outside diameter smaller than an outside diameter of the driving wheel.

2. The work machine according to claim 1, further comprising:
   a vehicle body frame including the transmission to transmit the driving force to the at least one of the front wheel or the rear wheel; and
   a retention frame holding the intermediate wheel such that the intermediate wheel is rotatable and capable of transmitting the driving force from the transmission to the intermediate wheel.

3. The work machine according to claim 2, wherein the retention frame includes:
   an intermediate wheel holder holding the intermediate wheel such that the intermediate wheel is rotatable;
   a wheel holder holding at least one wheel out of the front wheel and the rear wheel such that the at least one wheel is rotatable; and
   a pivot shaft provided for an intermediate portion of the retention frame which intermediate portion is between the intermediate wheel holder and the wheel holder, the pivot shaft being coupled to the vehicle body frame.

4. The work machine according to claim 3, further comprising:
   a wheel power transmission provided for the retention frame to transmit the driving force from the transmission to the at least one wheel held by the wheel holder; and
   an intermediate-wheel power transmission provided for the retention frame to transmit the driving force from the transmission to the intermediate wheel.

5. The work machine according to claim 4, further comprising:
   an input section provided for the pivot shaft to receive the driving force from the transmission; wherein
   the driving force from the input section is transmitted to the wheel power transmission; and
   the driving force from the input section is transmitted to the intermediate-wheel power transmission.

6. The work machine according to claim 5, wherein the retention frame includes the wheel holder to hold the at least one wheel out of the front wheel and the rear wheel such that the at least one wheel is rotatable.

7. The work machine according to claim 5, further comprising:
   a power transmission to receive the driving force from the transmission and transmit the driving force to the input section; wherein
   the power transmission is capable of being braked.

8. The work machine according to claim 5, wherein the wheel power transmission and the intermediate-wheel power transmission each include an endless roller chain.

9. The work machine according to claim 5, wherein the wheel power transmission and the intermediate-wheel power transmission each include a gear transmission section.

10. The work machine according to claim 9, wherein the gear transmission section is operable to change a rotation direction of power from the input section so as to cause the at least one wheel and the intermediate wheel held by the intermediate wheel holder to rotate in a direction reverse to a rotation direction of the input section, and output the power.

11. The work machine according to claim 3, wherein the retention frame is supported by the vehicle body frame so as to be swingable around a pivot shaft axis of the pivot shaft as a swing axis which pivot shaft axis extends along a width of a body of the work machine.

12. The work machine according to claim 3, wherein the wheel holder holds the rear wheel.

13. The work machine according to claim 6, wherein
the retention frame includes a wheel-side portion and an intermediate-wheel-side portion, the wheel-side portion extending from the intermediate portion toward the wheel holder, the intermediate-wheel-side portion extending from the intermediate portion toward the intermediate wheel holder; and in a side view of a body of the work machine:
the wheel-side portion is higher in position than the intermediate-wheel-side portion; and
the wheel-side portion is inclined away from the intermediate portion.

14. A work machine, comprising:
a boarding operation section provided for a rear portion of a vehicle body of the work machine;
a front wheel;
a rear wheel;
an intermediate wheel between the front wheel and the rear wheel; and
a retention frame provided laterally outward of a vehicle body frame of the work machine to hold the intermediate wheel and the rear wheel; wherein
the retention frame extends in a front-rear direction below the operation section in a side view of the vehicle body.

15. The work machine according to claim 14, wherein the retention frame has a center in the front-rear direction which center is rearward of a center of the vehicle body frame in the front-rear direction.

16. The work machine according to claim 14, further comprising:
a pivot shaft including a pivot shaft axis extending in along a width of the body; wherein
the retention frame is coupled to the vehicle body frame with use of the pivot shaft and held by the vehicle body frame so as to be swingable around the pivot shaft axis as a swing axis; and
the intermediate wheel and the rear wheel are attached to the vehicle body frame via the retention frame in so as to be vertically swingable.

17. The work machine according to claim 14, further comprising:
an actuator to operate the retention frame; wherein
the actuator is capable of changing the retention frame between a first posture in which the intermediate wheel and the rear wheel are grounded and a second posture in which the intermediate wheel is ungrounded.

18. The work machine according to claim 14, further comprising:
a coupler to couple a work device with the vehicle body so as to allow the vehicle body to tow the work device.

* * * * *